United States Patent
Kitano

(10) Patent No.: US 10,020,874 B2
(45) Date of Patent: Jul. 10, 2018

(54) ANTENNA DEVICE, COMMUNICATION DEVICE AND COMMUNICATION SYSTEM

(71) Applicant: NEC CORPORATION, Tokyo (JP)

(72) Inventor: Shinichiro Kitano, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 15/558,651

(22) PCT Filed: Dec. 24, 2015

(86) PCT No.: PCT/JP2015/006440
§ 371 (c)(1),
(2) Date: Sep. 15, 2017

(87) PCT Pub. No.: WO2016/147242
PCT Pub. Date: Sep. 22, 2016

(65) Prior Publication Data
US 2018/0109310 A1 Apr. 19, 2018

(30) Foreign Application Priority Data

Mar. 17, 2015 (JP) .................................. 2015-053138

(51) Int. Cl.
*H04B 1/60* (2006.01)
*H04B 17/02* (2006.01)
(Continued)

(52) U.S. Cl.
CPC ........... *H04B 7/18513* (2013.01); *H01Q 3/04* (2013.01); *H01Q 15/24* (2013.01);
(Continued)

(58) Field of Classification Search
CPC ............................ H04B 7/18513; H04B 17/40
(Continued)

(56) References Cited

U.S. PATENT DOCUMENTS 3,771,162 A * 11/1973 Dienes .................. H01Q 21/26
343/797
5,959,589 A * 9/1999 Sadovnik ................. H01Q 3/04
343/757
(Continued)

FOREIGN PATENT DOCUMENTS

JP         57-204710 A     12/1982
JP         05-211457 A      8/1993
(Continued)

OTHER PUBLICATIONS

International Search Report for PCT/JP2015/006440, dated Feb. 2, 2016.

*Primary Examiner* — Tilahun B Gesesse
(74) *Attorney, Agent, or Firm* — Sughrue Mion, PLLC

(57) ABSTRACT

An antenna device includes a reflecting mirror, a primary radiator connected with a wireless device including a transmitter and a receiver, a radiator support mechanism that rotatably supports the primary radiator at a focusing position of the mirror with respect to a central axis of the radiator, evaluation data acquisition unit that acquires evaluation data that is data regarding a polarization direction angle that is a tilt angle of a polarization plane of the radiator with respect to a horizontal direction, a tilt angle of its own device correlated with the polarization direction angle, or a detection level, polarization plane adjuster that adjusts the polarization plane of the radiator based on the evaluation data, trigger input unit that inputs a trigger to the polarization plane adjuster, wherein the polarization plane adjuster rotates the radiator to adjust the polarization plane of the radiator according to timing provided by the trigger.

13 Claims, 13 Drawing Sheets

(51) Int. Cl.
    *H04M 1/00*         (2006.01)
    *H04B 1/38*          (2015.01)
    *H04B 7/00*          (2006.01)
    *H04B 7/185*        (2006.01)
    *H01Q 15/24*        (2006.01)
    *H04B 17/40*        (2015.01)
    *H01Q 3/04*         (2006.01)
    *H01Q 1/28*         (2006.01)

(52) U.S. Cl.
    CPC ......... *H04B 7/18515* (2013.01); *H04B 17/40* (2015.01); *H01Q 1/288* (2013.01)

(58) Field of Classification Search
    USPC .......................... 455/9, 562.1, 561, 560, 525
    See application file for complete search history.

(56) References Cited

U.S. PATENT DOCUMENTS 6,483,475 B1 * 11/2002 Tokuda .................. H01Q 1/247
                                                                                    343/781 R
9,666,959 B2 *  5/2017 Yamamoto ........... H01B 7/0045

FOREIGN PATENT DOCUMENTS

| JP | 07-005247 A | 1/1995 |
| JP | 2005-020638 A | 1/2005 |
| JP | 2005-333234 A | 12/2005 |

\* cited by examiner

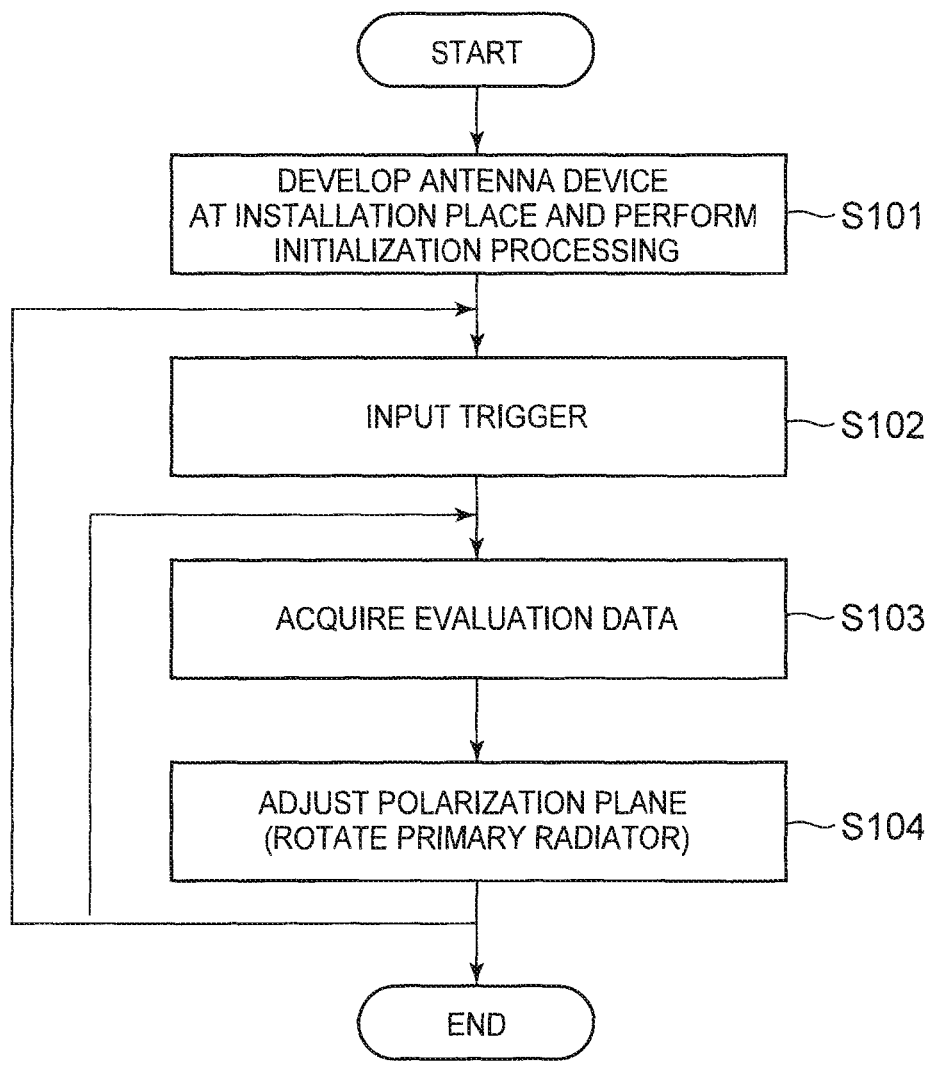

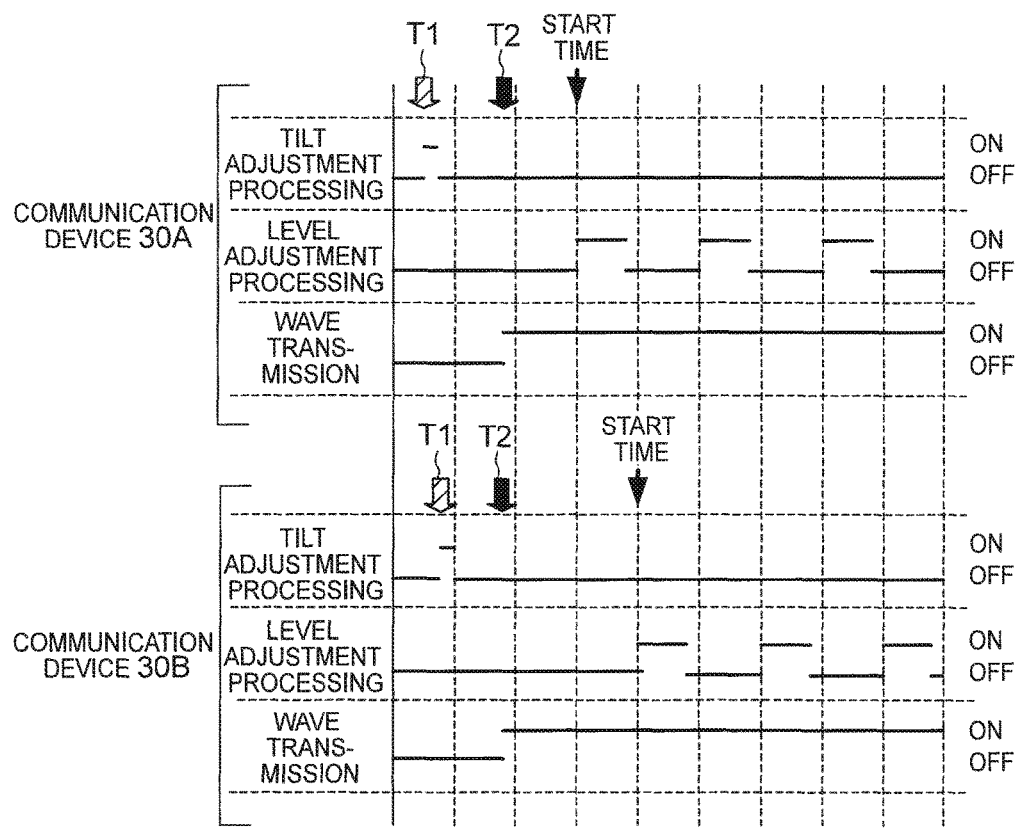

ANTENNA DEVICE, COMMUNICATION DEVICE AND COMMUNICATION SYSTEM

CROSS REFERENCE TO RELATED APPLICATIONS

This application is a National Stage of International Application No. PCT/JP2015/006440 filed Dec. 24, 2015, claiming priority based on Japanese Patent Application No. 2015-053138 filed Mar. 17, 2015, the contents of all of which are incorporated herein by reference in their entirety.

TECHNICAL FIELD

The present invention relates to an antenna device, a communication device, a communication system, a polarization plane control method, and a control program.

BACKGROUND ART

Communication performed beyond a line of sight of a radio wave, of communication performed using a radio wave, is called over-the-horizon communication or over horizon transmission (OH) communication. The over-the-horizon communication is used in communication between distant points where the distance between transmission and reception points exceeds 100 km or between points having an obstacle therebetween such as in a mountain range. Further, the over-the-horizon communication is used for build-out of a temporary communication line at the time of disaster or in the event of an emergency.

By the way, many of wireless communication systems perform transmission/reception of a radio wave, using a predetermined polarized wave such as a horizontal polarized wave, a vertical polarized wave, or a circularly polarized wave, from viewpoints of a decrease in coherence and effective use of frequency resources. In such communication systems, work to adjust polarization planes of radio waves transmitted/received between communication devices that perform communication is necessary.

Regarding polarization plane adjustment technologies in wireless communication systems, Patent Literature 1 describes a polarization plane adjustment technology in a reception device that receives a radio wave sent by a communication satellite. The reception device described in Patent Literature 1 includes a level detection circuit that detects a level of an electrical signal converted from the radio waves from the communication satellite, the radio waves having been received by a primary radiator, and a motor built in the primary radiator and which rotates the polarization plane. The wireless device controls the motor to make the level of the electrical signal supplied from the primary radiator and detected by the level detection circuit large, to adjust the polarization plane of the primary radiator to correspond to the polarized wave of the radio wave from the communication satellite.

CITATION LIST

Patent Literature

PTL 1: Japanese Patent Application Laid-Open No. 5-211457

SUMMARY OF INVENTION

Technical Problem

As described above, the over-the-horizon communication is used for build-out of a temporary communication line at the time of disaster or in the event of an emergency. Therefore, some communication devices, which perform the over-the-horizon communication, are designed to expect transfer.

In the over-the-horizon communication using such mobile communication devices, the work to adjust polarization planes of radio waves transmitted/received between the communication devices that perform communication is performed. Especially, the over-the-horizon communication has a large transmission loss in the middle of communication, and thus a decrease in a reception level due to a gap of the polarization planes may incur communication incapability.

Here, the technology described in Patent Literature 1 is made on the assumption that the communication devices serving as the transmission side and the reception side are determined in advance, and a radio wave with a fixed polarization plane is sent from the satellite communication as the transmission side. Therefore, a problem is not especially caused even if the polarization plane of the primary radiator is freely adjusted to maximize the detection level in the reception device. However, in a case of applying the technology described in Patent Literature 1 to communication devices that perform one-to-one over-the-horizon communication, occurrence of a problem that the adjustment processing is not terminated because the mutual communication devices try to adjust the polarization planes to the other side's polarization directions can be considered.

Therefore, an objective of the present invention is to provide an antenna device, a communication device, a communication system, a polarization plane control method, and a control program, which enable efficient adjustment of polarization planes of radio waves transmitted/received between communication devices, installation places of which are unfixed and which perform bidirectional communication.

Solution to Problem

An antenna device according to the present invention includes a reflecting mirror configured to focus a received radio wave into a predetermined focusing position, a primary radiator configured to be connected with a wireless device including a transmitter and a receiver, a radiator support mechanism configured to rotatably support the primary radiator at the focusing position of the reflecting mirror with respect to a central axis of the primary radiator, evaluation data acquisition means configured to acquire evaluation data that is data regarding a polarization direction angle that is a tilt angle of a polarization plane of the primary radiator with respect to a horizontal direction, a tilt angle of its own device correlated with the polarization direction angle, or a reception level that is a level of a radio wave received by the receiver using the primary radiator, polarization plane adjustment means configured to adjust the polarization plane of the primary radiator based on the evaluation data, and trigger input means configured to input a trigger to the polarization plane adjustment means, and the polarization plane adjustment means rotates the primary radiator to adjust the polarization plane of the primary radiator according to timing provided by the trigger.

Further, a communication device according to the present invention includes a transmitter, a receiver, a primary radiator, a reflecting mirror, a radiator support mechanism configured to rotatably support the primary radiator at a focusing position of the reflecting mirror with respect to a central axis of the primary radiator, evaluation data acquisition means configured to acquire evaluation data that is data regarding a polarization direction angle that is a tilt angle of a polarization plane of the primary radiator with respect to a horizontal direction, a tilt angle of its own device correlated with the polarization direction angle, or a reception level that is a level of a radio wave received by the receiver, using the primary radiator, polarization plane adjustment means configured to adjust the polarization plane of the primary radiator based on the evaluation data, and trigger input means configured to input a trigger to the polarization plane adjustment means, and the polarization plane adjustment means rotates the primary radiator to adjust the polarization plane of the primary radiator according to timing provided by the trigger.

Further, a communication system according to the present invention includes a first communication device and a second communication device, each of the first communication device and the second communication device including a transmitter, a receiver, a primary radiator, a reflecting mirror, a radiator support mechanism configured to rotatably support the primary radiator at a focusing position of the reflecting mirror with respect to a central axis of the primary radiator, evaluation data acquisition means configured to acquire evaluation data that is data regarding a polarization direction angle that is a tilt angle of a polarization plane of the primary radiator of the first communication device or the second communication device with respect to a horizontal direction, a tilt angle of its own device correlated with the polarization direction angle, or a reception level that is a level of a radio wave received by the receiver, using the primary radiator of the first communication device or the second communication device, polarization plane adjustment means configured to adjust the polarization plane of the primary radiator of the first communication device or the second communication device based on the evaluation data, and trigger input means configured to input a trigger to the polarization plane adjustment means, and the polarization plane adjustment means rotates the primary radiator to adjust the polarization plane of the primary radiator of the first communication device or the second communication device according to timing provided by the trigger of the first communication device or the second communication device.

Further, a polarization plane control method includes, in an antenna device or a communication device including the antenna device, the antenna device including a primary radiator connected to a transmitter and a receiver, a reflecting mirror, and a radiator support mechanism that rotatably supports the primary radiator at a focusing position of the reflecting mirror with respect to a central axis of the primary radiator, executing, by a control device, processing of acquiring evaluation data that is data regarding a polarization direction angle that is a tilt angle of a polarization plane of the primary radiator with respect to a horizontal direction, a tilt angle of its own device correlated with the polarization direction angle, or a reception level that is a level of a radio wave received by the receiver, using the primary radiator, according to timing provided by a predetermined trigger, and rotating the primary radiator based on the acquired evaluation data.

Further, a control program according to the present invention causes a computer included an antenna device or a communication device including the antenna device, the antenna device including a primary radiator connected to a transmitter and a receiver, and a radiator support mechanism that rotatably supports the primary radiator at a focusing position of a reflecting mirror with respect to a central axis of the primary radiator, to execute processing of acquiring evaluation data that is data regarding a polarization direction angle that is a tilt angle of a polarization plane of the primary radiator with respect to a horizontal direction, a tilt angle its own device correlated with the polarization direction angle, or a reception level that is a level of a radio wave received by the receiver, using the primary radiator, according to timing provided by a predetermined trigger, and rotating the primary radiator based on the acquired evaluation data.

Advantageous Effects of Invention

According to the present invention, adjustment of polarization planes of radio waves transmitted/received between communication devices, installation places of which are unfixed and which perform bidirectional communication can be efficiently performed.

BRIEF DESCRIPTION OF DRAWINGS

FIG. 4 It depicts a flowchart illustrating an example of an operation of the antenna device 10 of the first exemplary embodiment.

FIG. 14 It depicts a timing chart illustrating an example of the control timing of the communication device 30A and the communication device 30B.

DESCRIPTION OF EMBODIMENTS

First Exemplary Embodiment

Figure 1:
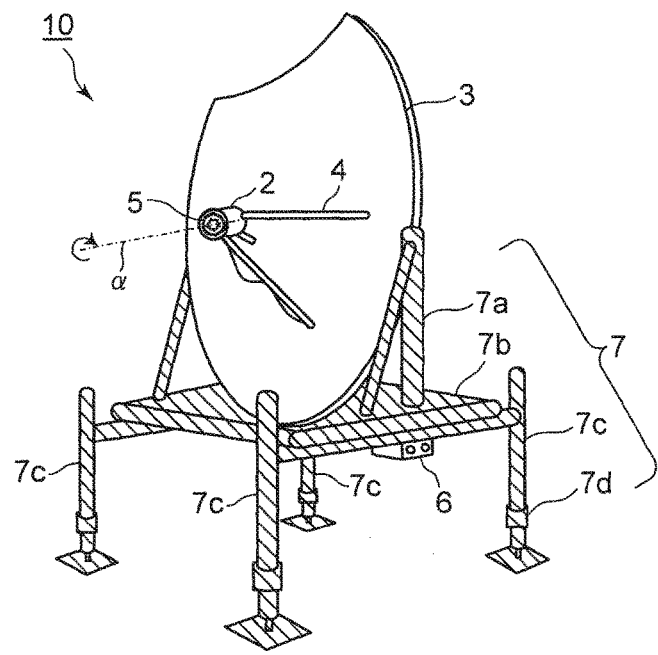
FIG. 1 It depicts a block diagram illustrating an example of an antenna device according to a first exemplary embodiment.

Hereinafter, an exemplary embodiment of the present invention will be described with reference to the drawings. FIG. 1 is a schematic diagram illustrating an example of an antenna device according to a first exemplary embodiment. An antenna device 10 illustrated in FIG. 1 is an example of an antenna device used in a communication device that performs bidirectional communication, and of an antenna device having portability. Note that the portability of the antenna device in the present example is realized using a moving boy, for example.

The antenna device 10 illustrated in FIG. 1 includes a primary radiator 2, a reflecting mirror 3, a radiator support mechanism 4, drive means 5, a polarization plane control device 6, and a support mechanism 7.

The primary radiator 2 radiates a radio wave input from a waveguide (not illustrated) toward the reflecting mirror 3, and outputs the radio wave reflected at the reflecting mirror 3 and input to the primary radiator 2 to the waveguide. The primary radiator 2 may be a power feed waveguide having a necessary opening that is made by gradually enlarging one end, such as a horn antenna or a waveguide horn. Further, the primary radiator 2 may be a planar antenna or a monopole antenna, and the shape and the structure are not especially limited.

In the present exemplary embodiment, the primary radiator 2 is connected with a wireless device 20 including a transmitter 21 and a receiver 22 through the waveguide, an optical cable, and a leading shaft cable. Note that FIG. 1 illustrates an example in which one primary radiator 2 is connected with the transmitter 21 and the receiver 22 through a transmission/reception switch 23. However, in a case where different primary radiators 2 are included for transmission and for reception, the primary radiator 2 for transmission may be connected with the transmitter 21, and the primary radiator 2 for reception may be connected with the receiver 22.

The reflecting mirror 3 may just have a function to focus a received radio wave into a predetermined focusing position. The reflecting mirror 3 may be a reflecting mirror having at least a part of a paraboloid of revolution. Note that the number of the reflecting mirrors 3 included in the antenna device 10 is not limited to one. For example, a combination of two or more reflecting mirrors 3 such as Gregorian-type or Cassegrain-type main reflecting mirror and sub reflecting mirror may be employed.

The radiator support mechanism 4 is a support structure that rotatably supports the primary radiator 2 at the focusing position of the reflecting mirror 3 with respect to a central axis of the primary radiator 2 (to be specific, a central axis of a radio wave radiated or received by the primary radiator 2). The radiator support mechanism 4 may include, for example, a radiator housing that rotatably accommodates the primary radiator 2 and a rod (support) typically called stay used to arrange the radiator housing at the focusing position of the reflecting mirror. Further, the radiator housing may include, for example, a rotation shaft that performs a rotation operation upon receiving a rotating drive force from the drive means 5, a bearing that supports the rotation shaft, a fixing mechanism that fixes the primary radiator 2, and a rotation transmission mechanism such as a belt drive, a gear and a coupling, which transmits the rotating drive force from the drive means 5 to the rotation shaft. Note that, in FIG. 1, $\alpha$ represents the central axis, that is, the rotation shaft of the primary radiator 2.

The drive means 5 may just be means that provides the rotation transmission mechanism included in the radiator support mechanism 4 with the rotating drive force, and may be, for example, an electric motor such as a stepping motor. The drive means 5 is coupled with the rotation shaft of the housing that accommodates the primary radiator 2 through the rotation transmission mechanism of the radiator support mechanism 4.

Note that FIG. 1 illustrates an example in which the drive means 5 is arranged near the primary radiator 2 arranged at a front side of the reflecting mirror 3. However, the drive means 5 may be provided at a back side of the reflecting mirror 3, for example. For example, the drive means 5 can be provided at the back side of the reflecting mirror 3 in a case where a plurality of the reflecting mirrors 3 is combined, such as a main reflecting mirror and a sub reflecting mirror, and the primary radiator 2 is arranged near a vertex of the main mirror, or a case where the radiator support mechanism 4 includes a rotation mechanism that rotates the primary radiator 2 together with a stay on the back side of the reflecting mirror 3.

The polarization plane control device 6 is a device that controls (adjusts) a polarization direction of the radio wave transmitted/received by the primary radiator 2 based on predetermined evaluation data acquirable by its own device. The polarization plane control device 6 may be a computer (information processing device) that includes an interface for connection with external devices such as the drive means 5, the transmitter 21, the receiver 22, and various sensors, a central processing unit (CPU) operated according to a program, and a storage device.

The support mechanism 7 may just be a support structure that supports at least the reflecting mirror 3. The support mechanism 7 may include, as illustrated in FIG. 1, a base 7b on which the reflecting mirror 3 is mounted, a pole 7a that supports the reflecting mirror 3 on the base 7b, and a plurality of leg portions 7c that supports the base 7b. Note that each of the leg portions 7c of the present example is provided with an expansion mechanism 7d (for example, a hydraulic cylinder) expandable at least in an up and down direction. When the leg portions 7c are expanded or contracted in the up and down direction in a state where the leg portions 7c are spread out in a vehicle width direction of a moving body such as a truck, the antenna device 10 can be mounted on the moving body from a grounded state. With the configuration, the antenna device 10 can be moved using the moving body.

Further, the support mechanism 7 can horizontally hold a body to be supported by adjusting an expansion/contraction amount of the leg portions 7c and causing the leg portions 7c to be grounded in accordance with an inclination of a surface of the ground as long as the inclination falls within a predetermined inclination angle range, when developing the body to be supported on an installation place.

Figure 2:
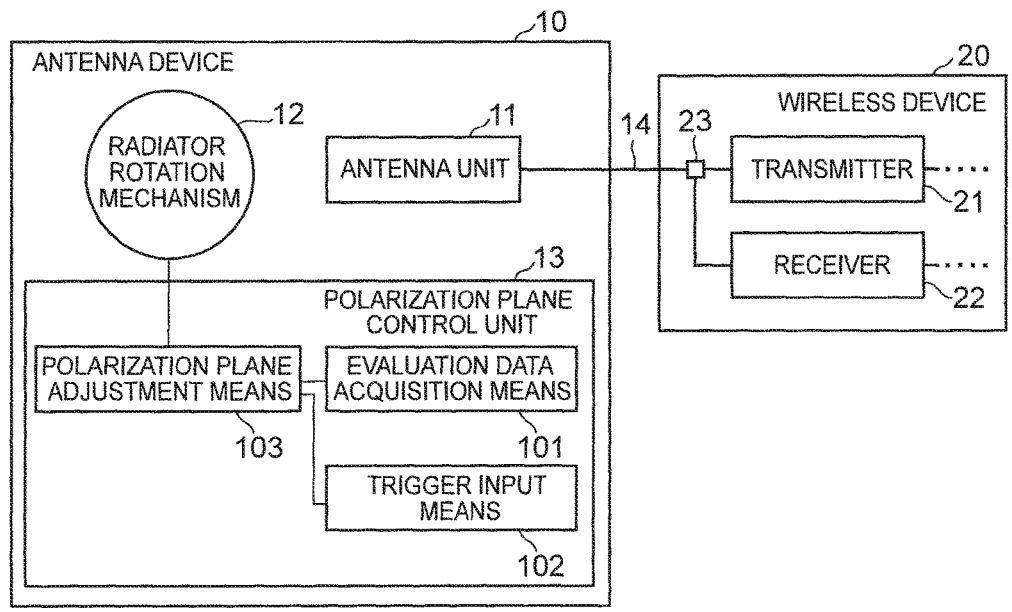
FIG. 2 It depicts a block diagram illustrating a configuration example focusing on a functional aspect of an antenna device 10.

FIG. 2 is a block diagram illustrating a configuration example focusing on a functional aspect of the antenna device 10 of the present exemplary embodiment. As illustrated in FIG. 2, the antenna device 10 of the present exemplary embodiment includes at least an antenna unit 11, a radiator rotation mechanism 12, and a polarization plane control unit 13. In FIG. 2, the antenna unit 11 is means that realizes a function of a typical antenna, and to be specific, corresponds to the primary radiator 2, the reflecting mirror 3, the waveguide (not illustrated), and at least a part of the radiator support mechanism 4 (for example, a portion that supports the primary radiator 2 at the focusing position of the reflecting mirror 3). Further, the radiator rotation mechanism 12 is means that realizes a function to rotate the primary radiator 2 while keeping the primary radiator 2 arranged at the focusing position of the reflecting mirror 3, and to be specific, corresponds to a part of the radiator support mechanism 4 (a portion that rotatably supports the primary radiator 2, such as the bearing and the rotation transmission mechanism) and the drive means 5.

Further, the polarization plane control unit 13 is means that controls a polarization plane of the radio wave received by the primary radiator 2, and to be specific, corresponds to the polarization plane control device 6.

Further, FIG. 2 illustrates the wireless device 20, and a connection cable 14 such as an optical cable and a lead that connect the wireless device 20 and the antenna device 10 together, in addition to the above units and mechanism, as elements attached to the antenna device 10. Further, in FIG. 2, illustration of the support mechanism 7 is omitted.

As illustrated in FIG. 2, the polarization plane control unit 13 may include evaluation data acquisition means 101, trigger input means 102, and polarization plane adjustment means 103.

The evaluation data acquisition means 101 acquires predetermined evaluation data acquirable by its own device and evaluation data regarding a polarization direction angle $\varphi$ of the primary radiator 2, a tilt angle $\xi$ of its own device correlated with the polarization direction angle $\varphi$, or a reception level of the primary radiator 2. The evaluation data acquisition means 101 is realized by, for example, an interface for connection with a tilt sensor and level detection means of the receiver 22 (both are not illustrated), and information processing means operated according to a program.

Here, the polarization direction angle $\varphi$ of the primary radiator 2 is an angle of a polarization plane (polarization direction) of the primary radiator 2 with respect to a horizontal plane. To be specific, the polarization direction angle $\varphi$ is an angle 90° when a linearly polarized wave radiated from the primary radiator 2 is a vertical polarized wave, that is, the polarization plane is perpendicular to the horizontal plane, and is an angle 0° when the linearly polarized wave is a horizontal polarized wave, that is, the polarization plane is parallel to the horizontal plane. Note that 0° and 180° are treated as the polarization plane of the same angle in the polarization direction angle $\varphi$. Further, the primary radiator 2 of the present exemplary embodiment is rotatably supported, and thus the polarization direction angle $\varphi$ can take an arbitrary angle in a range of 0° to 180°. Further, in a case of transmitting/receiving two types of linearly polarized waves that are perpendicular to each other at the same time, such as use of dual polarization radar, the range of the polarization direction angle $\varphi$ may be set to 0° to 90°. In this case, 0° and 90° in the polarization direction angle $\varphi$ are treated as the polarization plane of the same angle.

Further, the tilt angle $\xi$ of its own device can take an angle of a tilt of any portion as long as the angle has correlation with polarization direction angle $\varphi$ of the primary radiator 2. For example, the tilt angle $\xi$ of its own device may be an angle of a predetermined plane of the pole 7a, the base 7b, or the leg portion 7c included in the support mechanism 7 with respect to the horizontal plane. This is because the portion has unchanged positional relationship with the rotation shaft of the primary radiator 2, and has a region parallel to or perpendicular to the horizontal plane when installed on a flat plane. Therefore, if the tilt of such a region with respect to the horizontal plane and a rotation angle $\theta$ that indicates a rotation amount of the current primary radiator 2 from a predetermined reference position are put together, the polarization direction angle $\varphi$ of the primary radiator 2 can be easily obtained. Note that the tilt angle $\xi$ of its own device may be detected using a tilt sensor (gravity sensor), for example.

Further, the reception level of the primary radiator 2 may be a level of the radio wave output from the primary radiator 2 to the receiver 22 as a connection destination or may be a level of an electrical signal detected after a gain is corrected in the receiver 22.

The trigger input means 102 inputs a trigger to the polarization plane adjustment means 103 described below, the trigger providing timing of control regarding adjustment of the polarization plane. The trigger input means 102 may be an interface for connection with an input device such as a switch that inputs a predetermined trigger in response to a user operation, for example. Further, the trigger input means 102 may be an interface for connection with one or more periodic interrupt means that generates an event with a predetermined period, for example. Further, the trigger input means 102 may be a circuit or a control device that inputs the trigger when an output of the tilt sensor exceeds a predetermined value or when the output of the tilt sensor deviates from a setting value by a predetermined value or more.

The polarization plane adjustment means 103 rotates the primary radiator 2 by driving the drive means 5 based on the evaluation data acquired by the evaluation data acquisition means 101, to adjust the polarization plane of the primary radiator 2. The polarization plane adjustment means 103 adjusts the polarization plane of the primary radiator 2 according to the timing of control provided by the trigger input from the trigger input means 102. The polarization plane adjustment means 103 is realized by an information processing device such as a CPU operated according to a program, for example.

FIGS. 3A to 3F are explanatory diagrams illustrating a relationship example between the polarization direction angle $\varphi$ of the primary radiator 2 and the tilt angle $\xi$ of its own device. Note that FIGS. 3A to 3F schematically illustrate a front surface of the antenna device 10 in horizontal view. In FIGS. 3A to 3F, a direction $\beta$ represents a direction of the polarization plane of the primary radiator 2. That is, the primary radiator 2 radiates the radio wave in which an electric field vibrates along the direction $\beta$, and most favorably receives the radio wave in which the electric field vibrates along the direction $\beta$. In a case of a primary radiator shared by two polarized waves, the direction $\beta$ represents one of directions of the two polarization planes that are perpendicular to each other, or a direction of the polarization plane on a side recognized as the horizontal polarized wave in the primary radiator in a case where the two polarized waves need to be distinguished. Hereinafter, the direction β may be referred to as polarization axis β.

Further, a direction X represents a horizontal direction, that is a direction parallel to the horizontal plane. Note that, in the present invention, when expressing the polarization direction angle φ, the right direction of the direction X is 0° and the left direction is 180°, for convenience, as viewed from a front side of the reflecting mirror 3. Note that counter-clockwise rotation as viewed from the front side is a positive angle.

Further, a direction U represents a horizontal axis in a body to be supported of the support mechanism 7. Note that, in the present example, the direction U is a plane direction of the base 7b on which the reflecting mirror 3 is mounted. Further, in the present example, the rotation angle θ of the primary radiator 2 is an angle of the direction β with respect to the direction U. Further, in the present example, the angle of the direction U made with the direction X is the tilt angle ξ of its own device. The sign 16 in the drawings represents the tilt sensor (gravity sensor or the like) for detecting the tilt angle ξ of its own device. Note that, as for the tilt angle and the rotation angle θ, the counter-clockwise rotation as viewed from the front side of the reflecting mirror 3, from a predetermined reference value, is a positive angle. In doing so, relationship φ=θ+ξ is defined between the polarization direction angle φ and the tilt angle ξ. If the tilt angle ξ and the rotation angle θ are known, the polarization direction angle φ can be obtained.

Note that 0° and 180° represent the polarization plane of the same angle in the polarization direction angle φ. Further, for example, in a case where the primary radiator 2 corresponds to dual polarized waves, 0° and 90° of the polarization direction angles φ represent the same polarization plane. In this case, the range of the rotation angle θ is simply set to 0° to 90°

Further, a direction γ represents a direction (inclination) of the ground of the installation place. In a case where the support mechanism 7 includes the plurality of leg portions 7c having the expansion mechanism 7d expandable in a height direction, like the example illustrated in FIG. 1, attention is needed for a point that the inclination of the ground and the direction of the horizontal axis of its own device do not necessarily accord with each other.

Figure 3A:
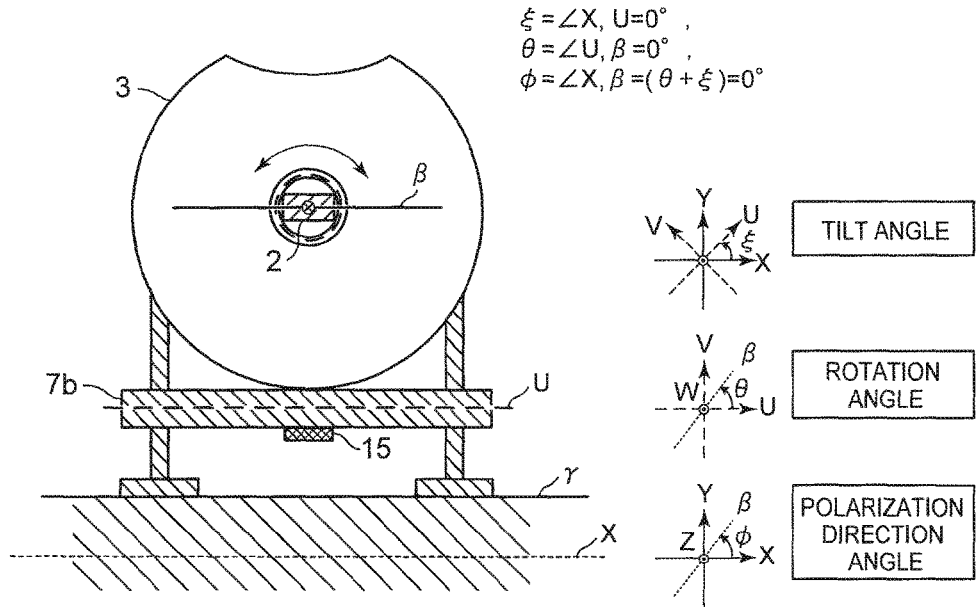
FIG. 3A It depicts an explanatory diagram illustrating a relationship example between a polarization direction angle $\varphi$ of a primary radiator 2 and a tilt angle $\xi$ of its own device.

FIG. 3A illustrates an example of the antenna device 10 horizontally developed in a place parallel to the horizontal plane. In this case, the tilt angle ξ=0° is measured by the tilt sensor 15. At this point of time, the primary radiator 2 is not rotated, that is, the rotation angle θ=0°. Note that, in the present example, the rotation angle θ is an angle of the direction β with respect to the direction U. With the values, the polarization direction angle φ of the primary radiator 2 of this time is calculated as φ=ξ+74 =0°. This indicates that at least one polarization plane of the primary radiator 2 in this state is in the horizontal direction. Therefore, when the primary radiator 2 radiates the radio wave in this state, at least a horizontal polarized wave in which the electric field vibrates in the direction parallel to the horizontal plane is emitted.

Figure 3B:
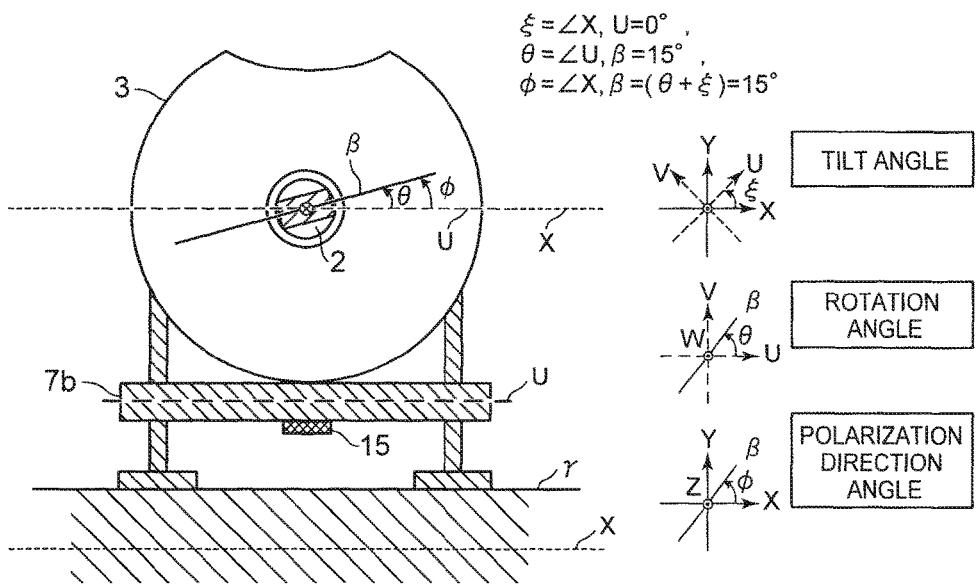
FIG. 3B It depicts an explanatory diagram illustrating a relationship example between the polarization direction angle $\varphi$ of the primary radiator 2 and the tilt angle $\xi$ of its own device.

Further, FIG. 3B illustrates an example of the antenna device 10 in which the primary radiator 2 is rotated in a + direction by 15° from the state illustrated in FIG. 3A. In the present example, the rotation angle θ=15°. Note that the tilt angle ξ is unchanged. With the values, the polarization direction angle φ of the primary radiator 2 of this time is calculated as φ=ξ+θ=15°. This indicates that at least one polarization plane of the primary radiator 2 in this state is inclined by 15° with respect to the horizontal direction. Therefore, when the primary radiator 2 radiates the radio wave in this state, at least a linearly polarized wave having the polarization plane at an angle of +15° with respect to the horizontal plane in an angle direction where clockwise rotation is positive with respect to a traveling direction is emitted.

Figure 3C:
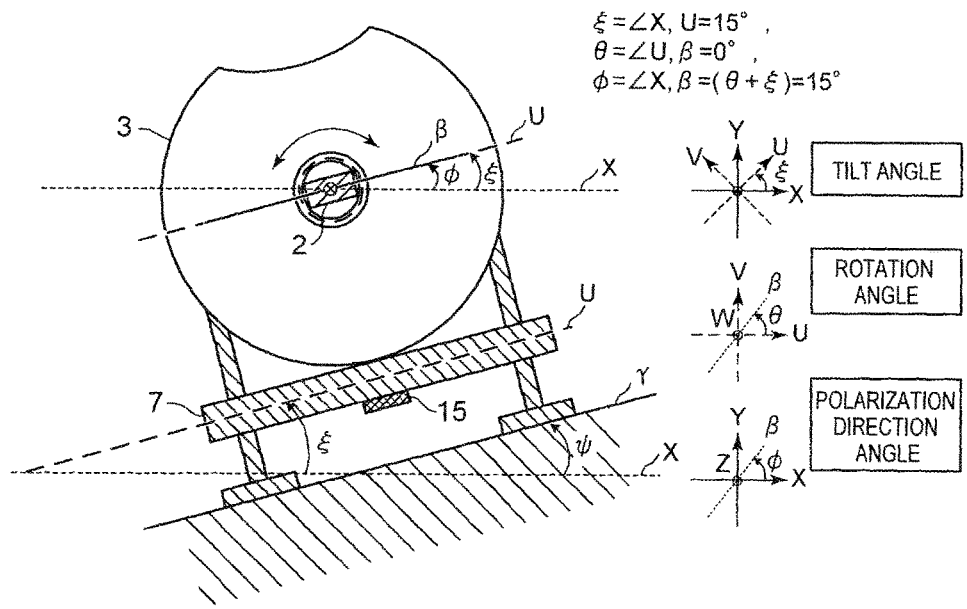
FIG. 3C It depicts an explanatory diagram illustrating a relationship example between the polarization direction angle $\varphi$ of the primary radiator 2 and the tilt angle $\xi$ of its own device.

Further, FIG. 3C illustrates an example of the antenna device 10 developed on and in parallel to a slope having an inclination of 15° with respect to the horizontal plane. In FIG. 3C, ψ represents an inclination angle of the slope (ψ=15°). In this case, the tilt angle ξ=15° is measured by the tilt sensor 15. Further, at this point of time, the primary radiator 2 is not rotated, that is, the rotation angle θ=0°. With the values, the polarization direction angle φ of the primary radiator 2 of this time is calculated as φ=ξ+0=15°. Therefore, when the primary radiator 2 radiates the radio wave in this state, at least a linearly polarized wave having the polarization plane at an angle of +15° with respect to the horizontal plane in the angle direction where clockwise rotation is positive with respect to the traveling direction is emitted. Note that the linearly polarized waves radiated in FIGS. 3B and 3C are linearly polarized waves having the same angle when the clockwise rotation is positive with respect to the traveling direction. Therefore, if the antenna device 10 illustrated in FIG. 3B and the antenna device 10 illustrated in FIG. 3C are arranged to face each other, the transmitted/received polarization waves become linearly polarized waves having perpendicular relationship.

Figure 3D:
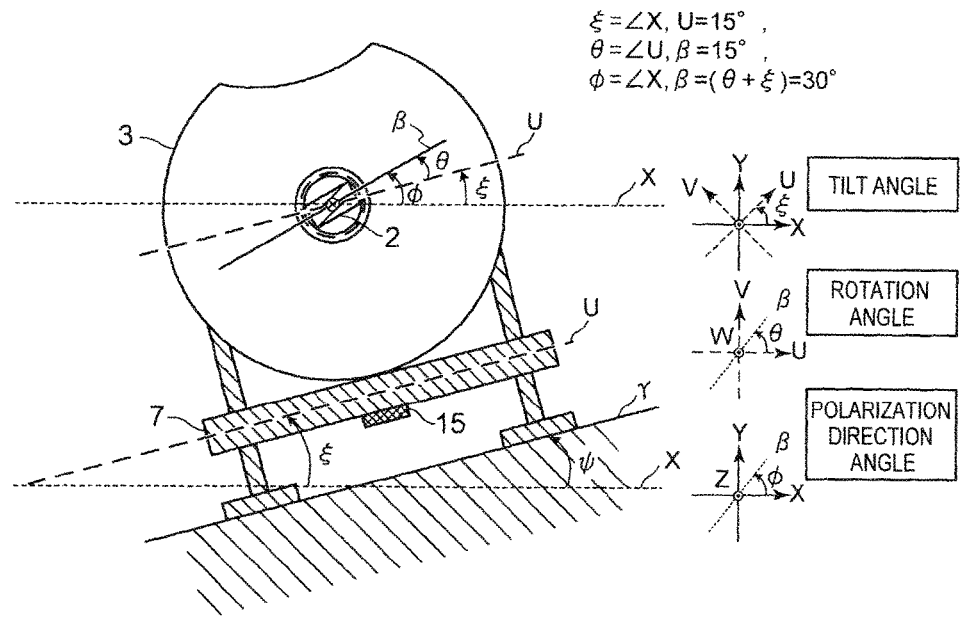
FIG. 3D It depicts an explanatory diagram illustrating a relationship example between the polarization direction angle $\varphi$ of the primary radiator 2 and the tilt angle $\xi$ of its own device.

Further, FIG. 3D illustrates an example of the antenna device 10 in which the primary radiator 2 is rotated in the + direction by 15° from the state illustrated in FIG. 3C. In the present example, the rotation angle θ=15°. Note that the tilt angle ξ is unchanged. With the values, the polarization direction angle φ of the primary radiator 2 of this time is calculated as φ=ξ+θ=30°. This indicates that at least one polarization plane of the primary radiator 2 in this state is inclined by 30° with respect to the horizontal direction. Therefore, when the primary radiator 2 radiates the radio wave in this state, at least a linearly polarized wave having the polarization plane at an angle of +30° with respect to the horizontal plane in the angle direction where the clockwise rotation is positive with respect to the traveling direction is emitted.

Figure 3E:
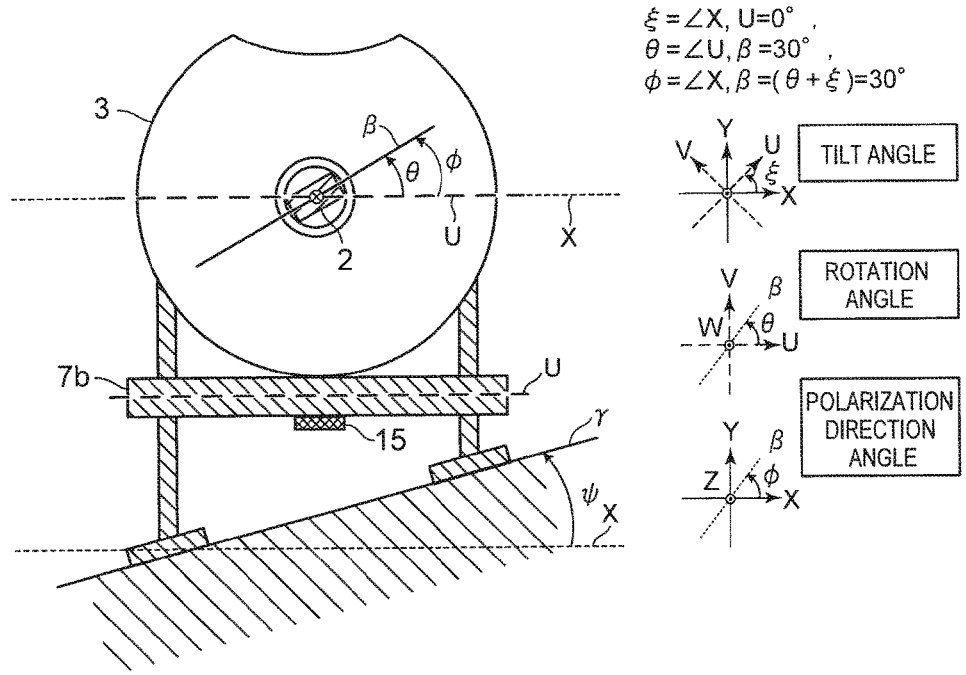
FIG. 3E It depicts an explanatory diagram illustrating a relationship example between the polarization direction angle $\varphi$ of the primary radiator 2 and the tilt angle $\xi$ of its own device.

Further, FIG. 3E illustrates an example of the antenna device 10 horizontally developed on a slope having an inclination of 15° with respect to the horizontal plane. In this case, the tilt angle ξ=0° is measured by the tilt sensor 15. Further, in the present example, the primary radiator 2 is rotated by 15° in the + direction)(0=15°. With the values, the polarization direction angle φ of the primary radiator 2 of this time is calculated as φ=ξ+θ=15°. Therefore, when the primary radiator 2 radiates the radio wave in this state, at least a linearly polarized wave having the polarization plane at an angle of +15° with respect to the horizontal plane in the angle direction where the clockwise rotation is positive with respect to the traveling direction is emitted. Therefore, if the tilt angle ξ that is an angle in a right and left direction with respect to the horizontal plane of (especially, a reference plane) of its own device is obtained, the polarization direction angle φ can be obtained from the tilt angle ξ and the rotation angle θ, regardless of the degree of inclination of the point of the installation place. Here, the right and left direction refers to a right and left direction as viewed from the traveling direction of the radio wave.

Figure 3F:
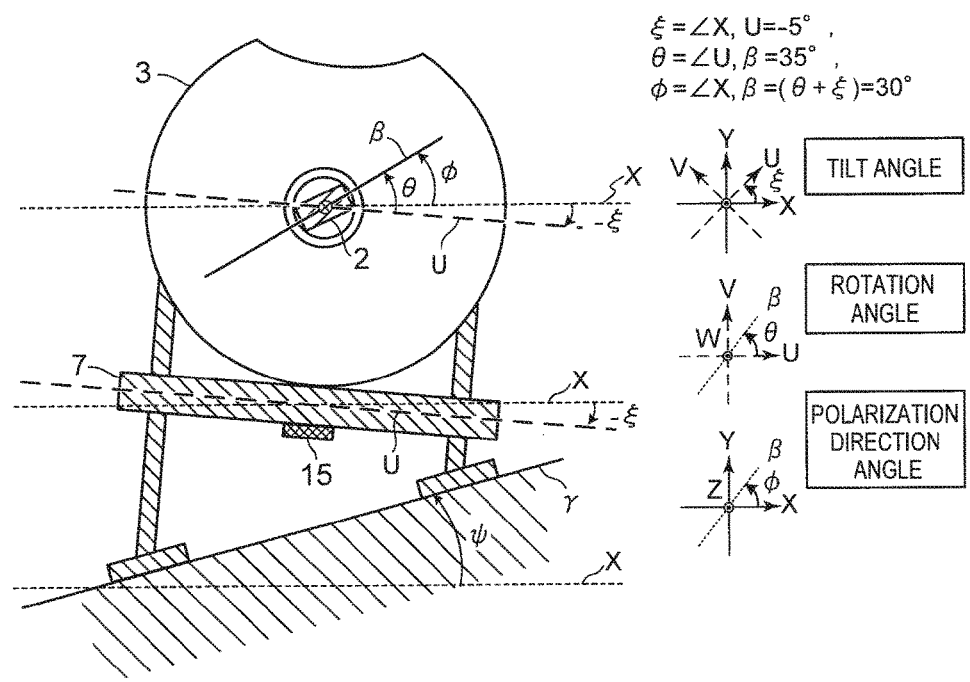
FIG. 3F It depicts an explanatory diagram illustrating a relationship example between the polarization direction angle $\varphi$ of the primary radiator 2 and the tilt angle $\xi$ of its own device.

Further, FIG. 3F illustrates an example of the antenna device 10 developed on a slope having an inclination of 15° with respect to the horizontal plane without keeping a horizontal posture. Note that, in the present example, the antenna device 10 has tried to keep the horizontal posture but is developed being slightly inclined)(−5° with respect to the horizontal plane. In this case, the tilt angle $\xi=5°$ is measured by the tilt sensor 15. In such a case, for example, to obtain the polarization direction angle $\varphi$ of the primary radiator 2=30°, the primary radiator 2 is simply radiated to satisfy the rotation angle $\theta=\varphi-\xi=35°$. Therefore, at least a linearly polarized wave having the polarization plane at an angle of +30° with respect to the horizontal plane in the angle direction where the clockwise rotation is positive with respect to the traveling direction is emitted. In this way, even in a case of obtaining a desired polarization direction angle $\varphi$, if the tilt angle $\xi$ of its own device is obtained, an optimum rotation angle $\theta$ can be obtained based on the tilt angle $\xi$, regardless of the degree of inclination of the point of the installation place. To obtain the desired polarization direction angle $\varphi$, adjustment of the polarization plane of the primary radiator 2 can be quickly performed by the smallest number of rotation from the current rotation angle by one drive command.

Note that FIGS. 3A to 3F illustrate examples in which the tilt sensor 15 for detecting the tilt angle $\xi$ is provided in the support mechanism 7 (to be specific, in the base 7b of the support mechanism 7). However, the installation place of the tilt sensor 15 is not limited to the above places. For example, the tilt sensor 15 may be provided in another portion of the support mechanism 7, or may be provided in a portion of other than the support mechanism 7 (for example, a back surface of the reflecting mirror 3, the radiator housing of the radiator support mechanism 4, or the rotation shaft of the radiator support mechanism 4).

Next, an operation of the antenna device 10 of the present exemplary embodiment will be described. FIG. 4 is a flowchart illustrating an example of an operation of the antenna device 10 of the present exemplary embodiment. Note that FIG. 4 illustrates an example of an operation of adjustment of the polarization plane of the primary radiator 2 in the antenna device 10.

As illustrated in FIG. 4, the antenna device 10 of the present exemplary embodiment is developed in the installation place, performs necessary initialization processing when a power source is supplied, and then becomes in a trigger receiving state (step S101).

After that, the trigger input means 102 inputs a predetermined trigger to the polarization plane adjustment means 103 according to set content set by a user operation or in the initialization processing (step S102).

When the predetermined trigger is input from the trigger input means 102, the polarization plane adjustment means 103 performs processing of adjusting the polarization plane of the primary radiator 2 according to timing provided by the input trigger. In the present example, when the trigger is input from the trigger input means 102, the evaluation data acquisition means 101 acquires the evaluation data according to the timing provided by the input trigger, and the primary radiator 2 is rotated based on the acquired evaluation data (steps S103 and S104). At this time, the antenna device 10 may radiate a test radio wave in cooperation with the transmitter 21 if necessary.

In a case where different primary radiators 2 are included for transmission and for reception, the polarization plane adjustment means 103 may rotate the appropriate primary radiator 2 according to the triggers for the processing of adjusting the polarization planes of the respective primary radiators 2 input from the trigger input means 102. Alternatively, the polarization plane adjustment means 103 can rotate the primary radiator 2 for transmission to make a predetermined or specified polarization direction angle based on the tilt angle $\xi$ of its own device, and can rotate the primary radiator 2 for reception based on the level (reception level) of the radio wave received by the receiver 22, using the primary radiator 2.

Further, the operations of steps S103 and S104 may be repeated. Even in such a case, the polarization plane adjustment means 103 performs the processing of adjusting the polarization plane of the primary radiator 2 according to the timing provided by the trigger. Examples of the timing provided by the trigger input from the trigger input means 102 include start timing for the processing of performing the polarization plane, and start timing, pause timing, resume timing, and executable timing for adjustment processing based on the reception level (hereinafter, referred to as level adjustment processing), of the processing of adjusting the polarization plane.

As described above, according to the present exemplary embodiment, adjustment of the polarization planes between the communication devices, installation places of which are unfixed and which perform bidirectional communication can be efficiently performed. For example, by use of the antenna device 10 of the present exemplary embodiment, the primary radiator 2 can be rotated to have the polarization direction of the primary radiator 2 set to a predetermined direction, using the tilt angle $\xi$ of its own device, at the timing when the trigger is input, in each of the communication devices that perform communication. The antenna device 10 is not especially operated during movement, and can quickly adjust the mutual polarization planes at the destination. At this time, the communication devices do not need to wait for arrival of a communication partner and wave transmission from the communication partner. Further, all you need to do is to rotate the primary radiator 2. Therefore, even if the inclination of the ground of the installation place is large (for example, 6° or more), the mutual polarization planes can be easily adjusted, and the angle to adjust is not limited to the horizontal polarized wave or the vertical polarized wave.

For example, the antenna device 10 of the present exemplary embodiment may be configured to acquire level evaluation data that indicates the reception level from the receiver 22, and to adjust the polarization plane of the primary radiator 2 to maximize the reception level or to satisfy a predetermined level value based on the reception level indicated by the level evaluation data. According to the antenna device 10 of the present exemplary embodiment, the timing of the adjustment processing can be freely set by the input trigger. Therefore, the polarization plane can be adjusted to an optimum polarization plane at destinations. Further, the timing of the adjustment processing can be differentiated between a pair of the communication devices, and the adjustment processing can be performed only by one of the communication devices. Therefore, the polarization planes can be adjusted to the polarization direction angles at which favorable levels can be mutually obtained, while the problem that the adjustment processing is not terminated because the communication devices try to adjust the polarization planes to the other side's polarization planes is avoided.

As an example, in a case where the processing of adjusting the polarization plane of the polarization plane adjustment means 103 includes level adjustment processing, the trigger input means 102 may input a trigger that provides executable timing that indicates executable timing of the level adjustment processing. In such a case, the polarization plane adjustment means 103 may not perform the level adjustment processing at timing other than the executable timing according to the executable timing provided by the trigger. For example, the polarization plane adjustment means 103 pauses the level adjustment processing when the executable timing is terminated even during the level adjustment processing.

Further, as another example, in a case where the processing of adjusting the polarization plane of the polarization plane adjustment means 103 includes level adjustment processing, the trigger input means 102 may input a trigger that provide start timing, pause timing, and resume timing for the level adjustment processing. In such a case, the polarization plane adjustment means 103 may start the level adjustment processing provided by the trigger, pause the level adjustment processing according to the pause timing provided by the trigger, and resume the level adjustment processing according to the resume timing provided by the trigger. Here, the start timing and the resume timing may be read as timing that indicates start of the above-described executable timing. Further, the pause timing may be read as timing that indicates termination of the executable timing.

Here, the trigger is a trigger that indicates start of the level adjustment processing, and may be a start trigger (hereinafter, referred to as period specification start trigger) that includes a repetition period of execution and pause of the level adjustment processing, specification as to which of execution and pause is performed first at the time of start of the level adjustment processing, and a start time of the level adjustment processing. For example, a user may input the period specification start trigger that includes specification to perform "execution" first to either one of two communication devices that perform communication and may input the period specification start trigger that includes specification to perform "pause" first to the other communication device, at the same start time with the same repetition period. In doing so, the start timing, the pause timing, and the resume timing for the level adjustment processing provided by the trigger input by the trigger input means 102 can be differentiated between the pair of communication devices. Note that the period specification start trigger may include specification as to whether a communication device is a primary station or a secondary station, in place of the specification as to which of execution and pause is performed first at the time of start of the level adjustment processing.

Figure 5:
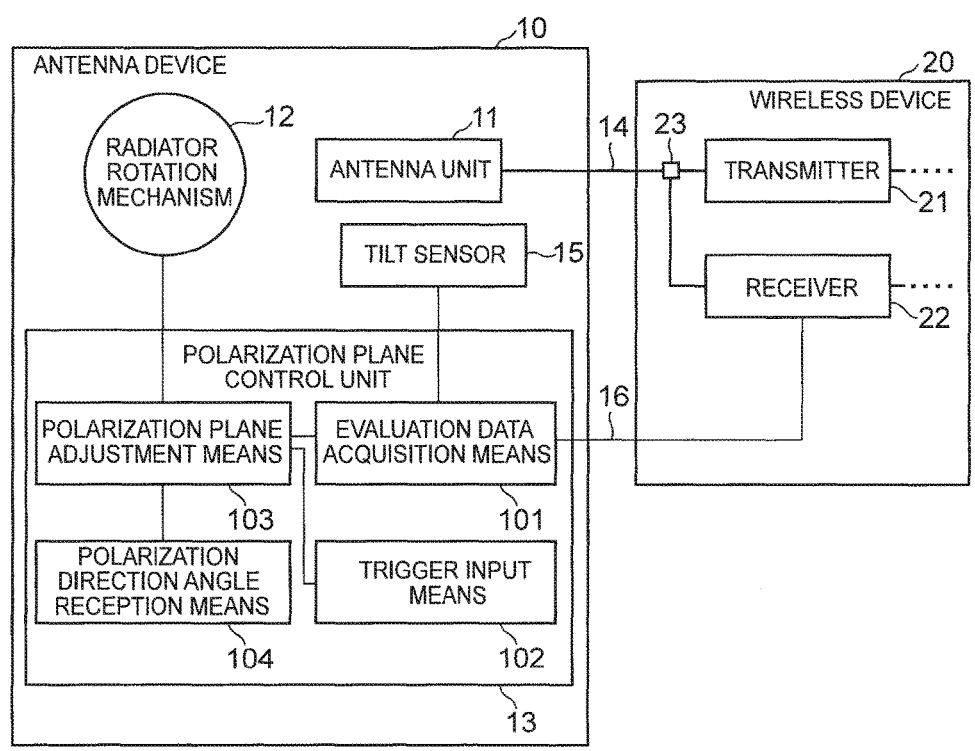
FIG. 5 It depicts a block diagram illustrating another configuration example focusing on the functional aspect of the antenna device 10.

Further, for example, as illustrated in FIG. 5, the polarization plane control unit 13 may further include polarization direction angle reception means 104 that receives a setting value of a polarization direction angle of the primary radiator 2. In such a case, the polarization plane adjustment means 103 may rotate the primary radiator 2 to cause the setting value received by the polarization direction angle reception means 104 and the polarization direction angle of the primary radiator 2 to accord with each other based on the evaluation data regarding the tilt angle detected using the tilt sensor 15. In doing so, the polarization plane of the primary radiator 2 can be adjusted to an arbitrary polarization direction angle. Note that FIG. 5 illustrates the tilt sensor 15 that detects the tilt angle ξ of its own device and a control line 16 for inputting the evaluation data from a level measurement unit (not illustrated) of the receiver 22, in addition to the polarization direction angle reception means 104.

In one-to-one over-the-horizon communication, antenna devices of a pair of communication devices are often arranged to approximately face each other on the surface of the ground. Therefore, if the polarization direction angles to be used for communication are determined in advance, and the communication devices independently adjust the polarization planes of the primary radiators 2 to make the predetermined polarization direction angles, the mutual polarization planes can be adjusted without wave transmission. Further, according to the present method, communication can be performed using the radio waves of arbitrary polarization planes between a pair of communication devices. Therefore, for example, the polarization plane can be changed at every communication, and a polarized wave other than the vertical polarized wave and the horizontal polarized wave can be used. Therefore, interception of communication can be decreased. Note that this adjustment is performed on the assumption that the polarized wave of the transmitted radio wave is received by the reception-side antenna device at an unchanged angle due to tropospheric scattering or the like. If the polarization direction is changed during a transmission path, the polarization direction angle may be specified only for one transmission device and the other transmission device may perform the adjustment processing based on the reception level. Such different use of the adjustment processing is possible by dividing the triggers.

Further, for example, the antenna device 10 of the present exemplary embodiment may be configured to adjust the polarization plane of the primary radiator 2, using both the tilt angle ξ of its own device and the reception level. For example, the antenna device 10 may be configured in such a manner that each of the communication devices adjusts the polarization plane of the primary radiator 2, using the tilt angle ξ of its own device at timing when a first trigger is input, and each of the communication devices adjust the polarization plane of the primary radiator 2, using the reception level according to timing provided by a second trigger when the second trigger is input. In doing so, not only the adjustment processing time by the reception level is shortened, but also a gap of the polarization plane, which cannot be adjusted only with the tilt angle ξ, can also be adjusted. For example, according to the above-described configuration, a gap of the polarization plane, which occurs due to an influence of a transmission path or a direction of the antenna, can also be adjusted.

Further, according to the present exemplary embodiment, even in an installation place where the body to be supported cannot be horizontally held if a maximum expansion/contraction amount is applied to the expansion mechanisms of the leg portions 7c, communication can be performed without performing work to reduce a slope of the installation place. Further, according to the present exemplary embodiment, the communication can be performed even if the body to be supported is not horizontally held. Therefore, work to adjust the expansion/contraction amounts of the leg portions 7c for horizontally holding the body to be supported can be omitted, and the installation time can be reduced. Further, a reflecting mirror having a diameter exceeding 3 m is often employed for the antenna device used in over-the-horizon communication, and the weight of the antenna device and a support mechanism that supports the antenna device may be several hundreds kg in total. To try to support such a heavy load in a horizontally holding state against a steep inclined surface, the expansion/contraction amount of the leg portion 7c needs to increase, and durability of the leg portion 7c becomes a problem. However, according to the present exemplary embodiment, the device is not necessarily horizontally held. Therefore, durability and reliability can be improved. Further, a further increase in weight and cost for improvement of durability of the leg portion 7c can be prevented. Further, according to the present exemplary embodiment, the installation place can be flexibly determined. That is, according to the present exemplary embodiment, increases in labor, weight, and cost are suppressed, an application range of the installation place can be enlarged by the simpler method, and adjustment of polarization planes of radio waves transmitted/received between communication devices that perform bidirectional communication can be performed.

Second Exemplary Embodiment

Figure 6:
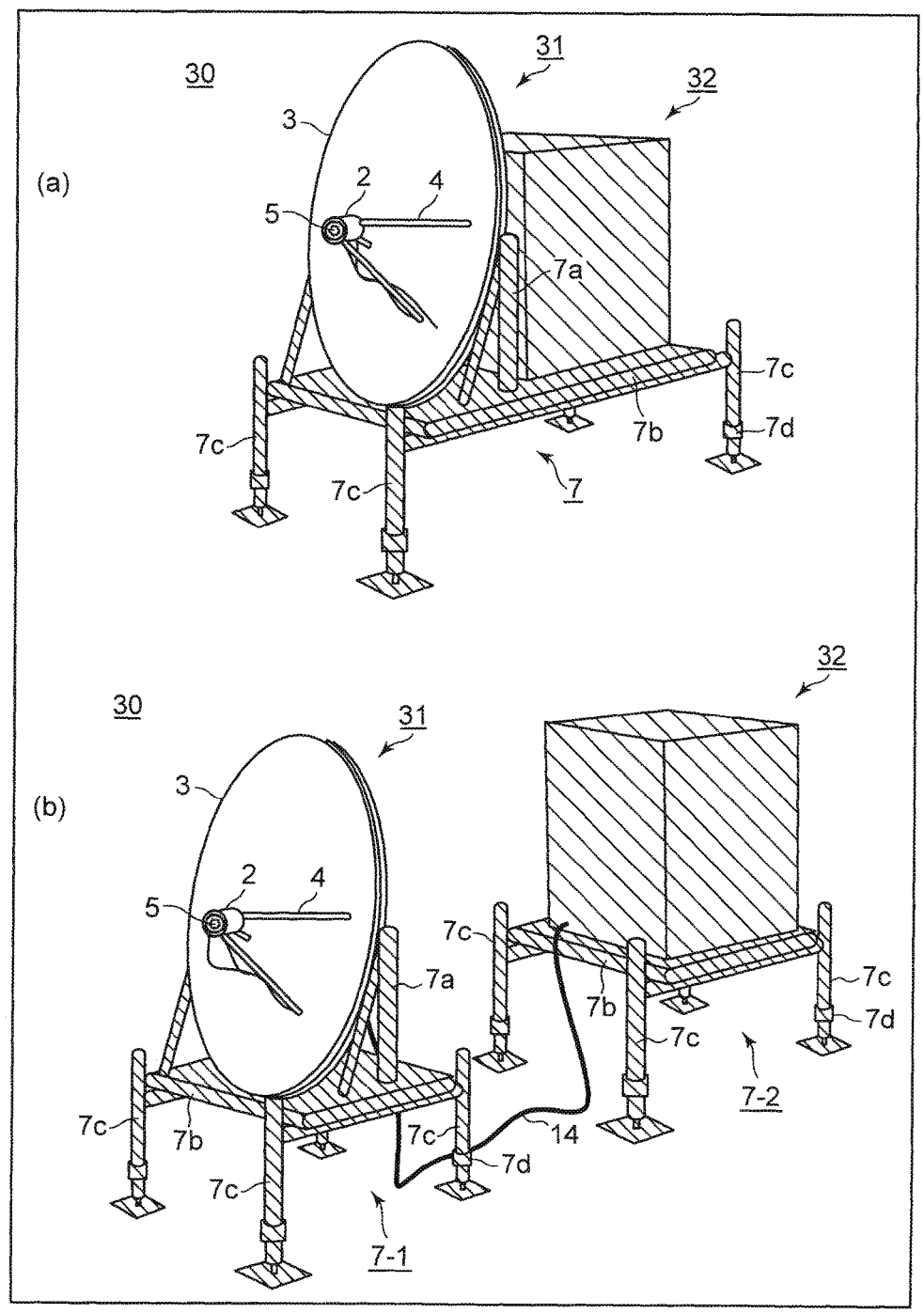
FIG. 6 It depicts a block diagram illustrating an example of a communication device according to a second exemplary embodiment.

Next, a second exemplary embodiment of the present invention will be described. FIG. 6 is a block diagram illustrating an example of a communication device according to the second exemplary embodiment. Note that FIG. 6(a) illustrates an example of a communication device in which an antenna device 31 and a wireless device 32 are integrated and mounted on one base 7b, and FIG. 6(b) illustrates an example of a communication device in which the antenna device 31 and the wireless device 32 are mounted on separate bases 7b. Hereinafter, in the example illustrated in FIG. 6(b), a support mechanism including the base 7b on which the antenna device 31 is mounted may be referred to as support mechanism 7-1, and a support mechanism including the base 7b on which the wireless device 32 is mounted may be referred to as support mechanism 7-2.

Figure 7:
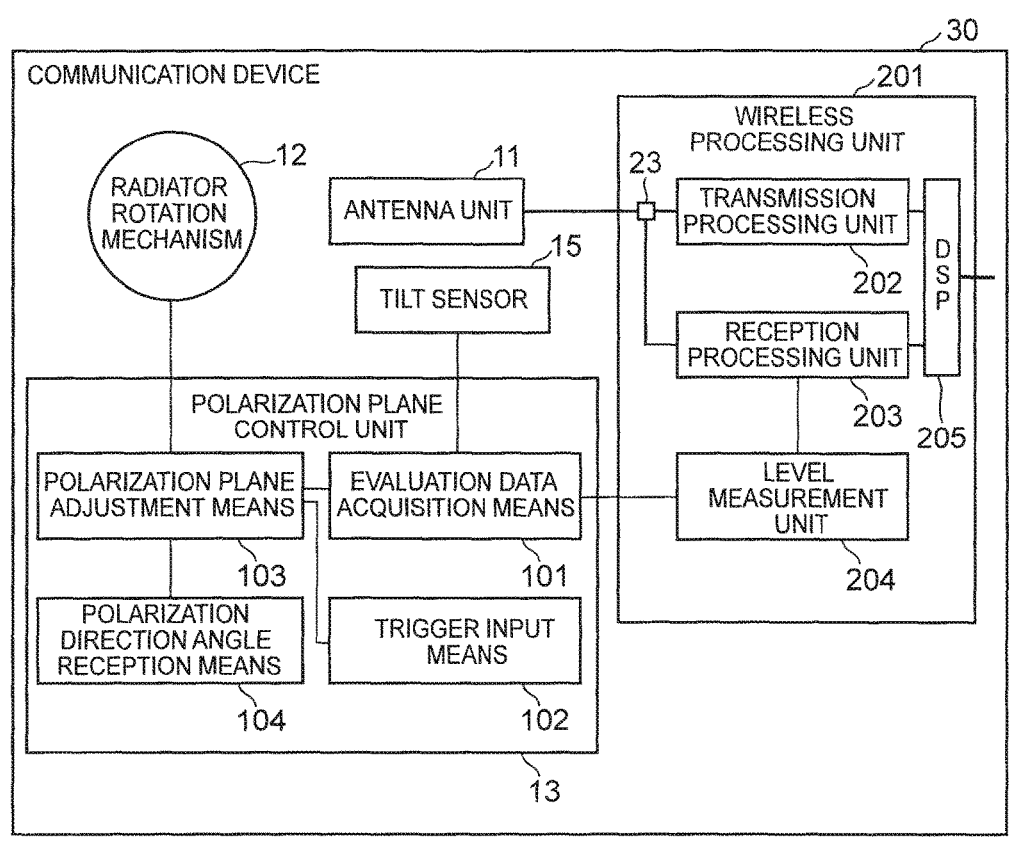
FIG. 7 It depicts a block diagram illustrating a configuration example focusing on a functional aspect of a communication device 30 of the present exemplary embodiment.

FIG. 7 is a block diagram illustrating a configuration example focusing on a functional aspect of a communication device 30 of the present exemplary embodiment. As illustrated in FIG. 7, the communication device 30 of the present exemplary embodiment includes at least an antenna unit 11, a radiator rotation mechanism 12, a polarization plane control unit 13, and a wireless processing unit 201. The communication device 30 may further include a tilt sensor 15 that detects a tilt of the antenna unit 11. Note that, as illustrated in FIG. 6(b), in a case where the antenna device 31 and the wireless device 32 are separated in the communication device 30, the tilt sensor 15 is provided on the side of the support mechanism 7-1 where the antenna device 31 is supported.

Hereinafter, in the present exemplary embodiment, an element similar to that in the first exemplary embodiment is denoted with the same sign, and description is omitted.

In FIG. 7, the antenna unit 11 is means that realizes a function of a typical antenna, and is, to be specific, realized by the primary radiator 2, a reflecting mirror 3, a waveguide (not illustrated), and at least a part of a radiator support mechanism 4 (for example, a portion that supports the primary radiator 2 at a focusing position of the reflecting mirror 3). Further, the radiator rotation mechanism 12 is means that realizes a function to rotate the primary radiator 2, and is, to be specific, realized by a part of the radiator support mechanism 4 (a portion that rotatably supports the primary radiator 2, such as a bearing and a rotation transmission mechanism), and drive means 5. Further, the polarization plane control unit 13 is means that controls (adjusts) a polarization direction of a radio wave transmitted/received by the primary radiator 2 based on predetermined evaluation data acquirable by its own device, and is, to be specific, realized by a polarization plane control device 6.

The above-described antenna device 31 may include, for example, the antenna unit 11, the radiator rotation mechanism 12, and the tilt sensor 15. Further, the wireless device 32 may include, for example, the wireless processing unit 201 and the polarization plane control unit 13. Note that the polarization plane control unit 13 may be included in the antenna device 31.

The wireless processing unit 201 of the present example includes a transmission processing unit 202, a reception processing unit 203, and a level measurement unit 204. Note that FIG. 7 illustrates an example in which the wireless processing unit 201 further includes a digital signal processor (DSP) 205. However, the wireless processing unit 201 may not include the DSP 205.

The transmission processing unit 202 is a processing unit corresponding to the transmitter 21 of the first exemplary embodiment, and performs processing of supplying, to the antenna unit 11, a radio wave that conveys data to be transmitted. The transmission processing unit 202 may modulate an electrical signal (modulated wave) of the data to be transmitted, which is input through the DSP 205, by a predetermined modulation method, and output the signal to the antenna unit 11. Note that the transmission processing unit 202 can have any specific configuration as long as the configuration is connectable with the antenna unit 11.

The reception processing unit 203 is a processing unit corresponding to the receiver 22 of the first exemplary embodiment, and performs processing of extracting data of a transmission source from a radio wave supplied from the antenna unit 11 and by which the data of the transmission source is conveyed. The reception processing unit 203 may demodulate the radio wave received by the antenna unit 11, and extract the modulated wave that is the electrical signal of the transmission source, for example. Note that the reception processing unit 203 can have any specific configuration as long as the configuration is connectable with the antenna unit 11.

The level measurement unit 204 measures a level of the radio wave or the electrical signal processed in the reception processing unit 203. The level measurement unit 204 may measure a power level of the modulated wave (electrical signal) extracted in the reception processing unit 203, or may measure an output level of an AD converter in a case where the reception processing unit 203 includes an analog-to-digital converter (ADC), for example. Note that the level measurement unit 204 can have any specific configuration as long as the configuration can output a signal corresponding to the magnitude of the radio wave or the electrical signal through a polarization plane of the antenna unit 11.

Figure 8:
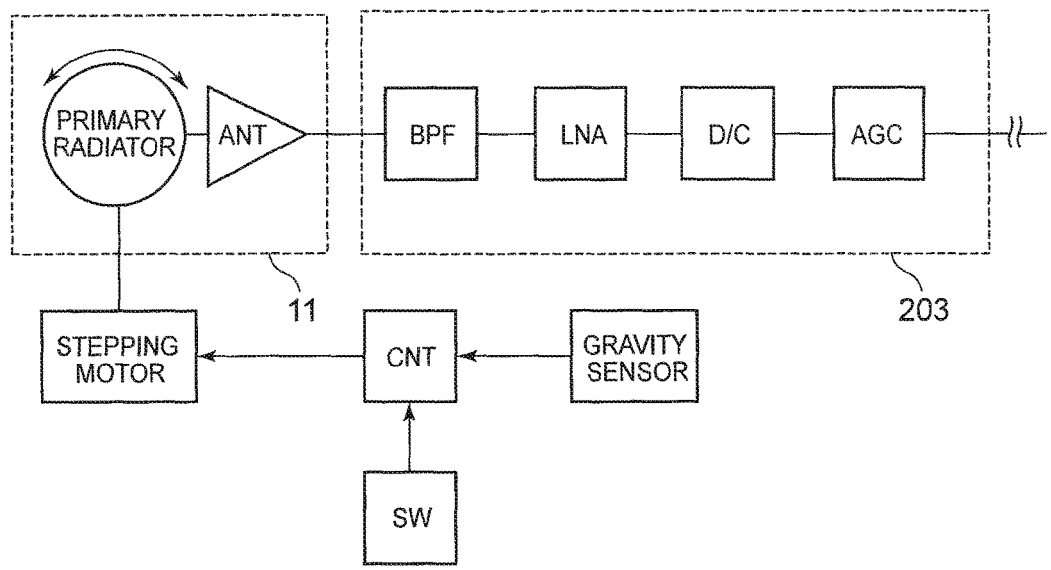
FIG. 8 It depicts a configuration diagram illustrating a more specific configuration example of the communication device 30 regarding processing of adjusting a polarization plane based on a tilt angle $\xi$.

FIG. 8 is a configuration diagram illustrating a more specific configuration example of the communication device 30 regarding processing of adjusting a polarization plane based on a tilt angle ξ. In FIG. 8, ANT represents a reflecting mirror 3. Further, BPF represents a band-pass filter. Further, LNA represents a low-noise amplifier (high-frequency amplifier). Further, D/C represents a down conversion (frequency converter). Further, AGC represents an automatic gain compensator. Further, LM represents a level measuring instrument. Further, CNT represents a control device. Further, SW represents a switch as an input device.

In FIG. 8, the primary radiator and the ANT correspond to the antenna unit 11. Further, the BPF, the LNA, the D/C, and the AGC correspond to the reception processing unit 203. Further, the CNT especially corresponds to the polarization plane adjustment means 103 of the polarization plane control unit 13. Further, a stepping motor corresponds to the drive means 5. Further, the SW especially corresponds to the trigger input means 102 of the polarization plane control unit 13. Further, a gravity sensor corresponds to the tilt sensor 15 for detecting the tilt angle $\xi$ of its own device correlated with a polarization direction angle $\varphi$ of the primary radiator included in the antenna unit 11.

In the example illustrated in FIG. 8, in the antenna unit 11, a radio wave radiated from a communication device (not illustrated) paired with the communication device 30 is reflected at the ANT (reflecting mirror 3) and is received by the primary radiator. The radio wave received by the primary radiator passes through the BPF of the reception processing unit 203, and only a predetermined frequency is selected and is amplified in the LNA. After that, the frequency is converted into an intermediate frequency in the D/C, and the gain is corrected in the AGC. Then, the radio wave is output to and demodulated in a detector (demodulator) (not illustrated).

The CNT performs necessary initialization processing, and then waits for an input of a trigger that provides start timing for tilt adjustment processing from the SW. Then, when the trigger that provides start timing for tilt adjustment processing is input from the SW, the CNT may operate the gravity sensor, and output a signal corresponding to a tilt of predetermined axial rotation (gravity working on the axis). When the signal corresponding to the tilt of predetermined axial rotation, which has been input from the gravity sensor, is input, the CNT calculates the tilt angle $\xi$ of its own device based on the signal. The CNT then drives the stepping motor (drive means 5) based on the calculated tilt angle $\xi$ and a current rotation angle $\theta$ of the primary radiator to rotate the primary radiator. Here, the CNT may output a drive signal that includes a rotating direction and the number of rotation to the stepping motor. The CNT obtains a current polarization direction angle $\varphi$ of the primary radiator from the calculated tilt angle $\xi$ and the current rotation angle $\theta$ of the primary radiator, and may then determine the rotating direction and the number of rotation in such a manner that the polarization direction angle $\varphi$ of the primary radiator becomes a predetermined angle.

Figure 9:
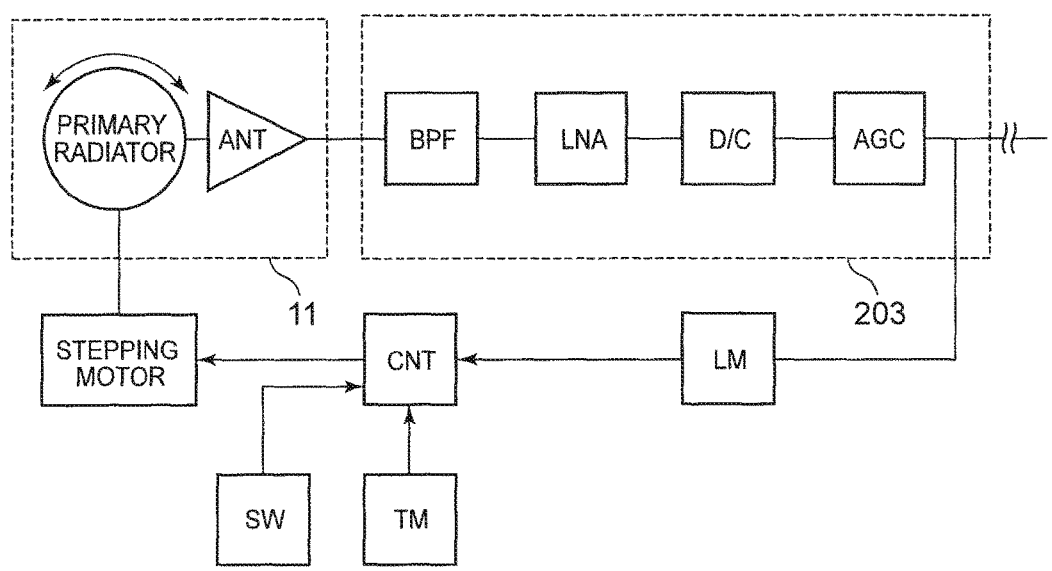
FIG. 9 It depicts a configuration diagram illustrating a more specific configuration example of the communication device 30 regarding processing of adjusting a polarization plane based on a reception level.

Further, FIG. 9 is a configuration diagram illustrating a more specific configuration example of the communication device 30 regarding processing of adjusting a polarization plane based on a reception level. Note that, in FIG. 9, TM represents periodic interrupt means.

In the example illustrated in FIG. 9, in the antenna unit 11, the radio wave radiated from the communication device (not illustrated) paired with the communication device 30 is reflected at the ANT (reflecting mirror 3) and is received by the primary radiator 2, similarly to FIG. 8. The radio wave received by the primary radiator passes through the BPF of the reception processing unit 203, and only a predetermined frequency is selected and is amplified in the LNA. After that, the frequency is converted into an intermediate frequency in the D/C, and the gain is corrected in the AGC. Then, the radio wave is output to and demodulated in a detector (demodulator) (not illustrated). Note that, in the present example, the output signal from the AGC is also input to the LN (level measuring instrument). The LN measures the level of the input signal, and outputs a signal that indicates the measurement result (a signal corresponding to a level value) to the CNT.

The CNT performs necessary initialization processing, and then waits for an input of a trigger that provides start timing for level adjustment processing from a user through the SW. When the trigger that provides start timing for the level adjustment processing is input from the user through the SW, the CNT initializes adjustment parameters and determines a state of at the time of start of the level adjustment processing according to the input trigger. Here, the CNT may start a timer for obtaining pause timing next and instantly start the level adjustment processing, in a case where the state of at the time of start of the level adjustment processing is "execution state". Further, when the state of at the time of start of the level adjustment processing is "execution state", the CNT may start a timer for obtaining resume timing next and pause the level adjustment processing until the timer expires. Further, the CNT operates the LN and drives the stepping motor (drive means 5) based on the signal that indicates the measurement result of the level from the LN, considering that a period until the Pause timer expires after starting or pausing the level adjustment processing is an execution period of the level adjustment processing. For example, the CNT may repeatedly perform processing of comparing the level value before rotation and the level value after rotation, and rotating the primary radiator in the same rotating direction when the level after rotation becomes larger, and rotating the primary radiator in a reverse direction with a decreased number of rotation when the level after rotation becomes smaller. In this way, the CNT may rotate the primary radiator up to the rotation angle that maximizes the level. Note that the CNT pauses the adjustment processing (at least the rotation operation) when the pause timing provided by the trigger from the TM arrives even during such repetitive processing. Further, the CNT resumes the adjustment processing when the resume timing provided by the trigger from the TM arrives during pause of the adjustment processing.

Figure 10:
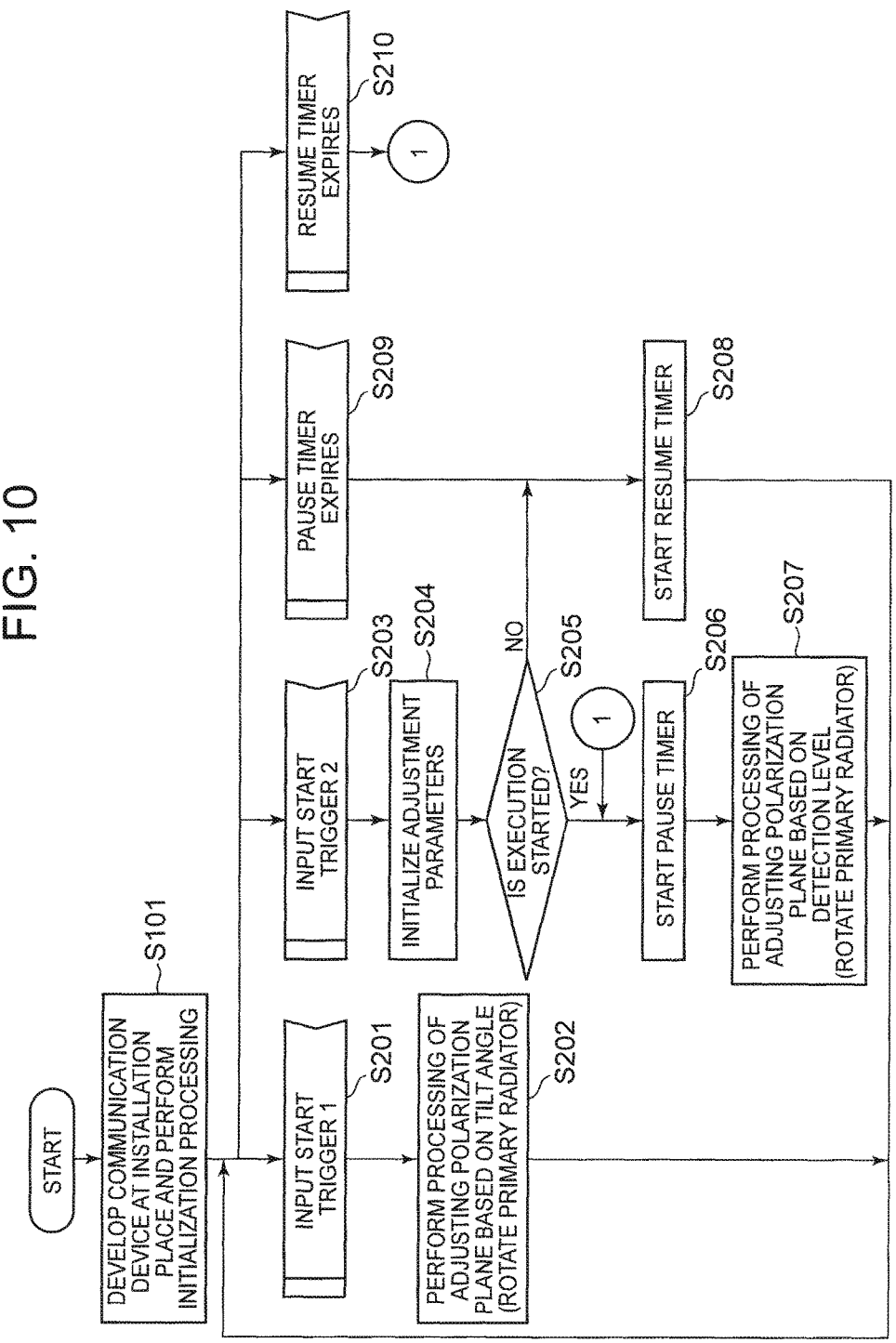
FIG. 10 It depicts a flowchart illustrating an example of an operation of polarization plane adjustment means 103 in the communication device 30 of the second exemplary embodiment.

FIG. 10 is a flowchart illustrating an example of an operation of the polarization plane adjustment means 103 in the communication device 30 of the present exemplary embodiment. As illustrated in FIG. 10, the polarization plane adjustment means 103 performs necessary initialization processing when its own device is developed in an installation place and a power source is supplied, and then becomes in a trigger receiving state (step S101). After that, when a first start trigger that provides a start event for the processing of adjusting a polarization plane based on the tilt angle $\xi$ of its own device is input from the trigger input means 102 (step S201), the polarization plane adjustment means 103 rotates the primary radiator 2 based on the evaluation data regarding the tilt angle $\xi$ of its own device, which is detected in the tilt sensor 15, and performs tilt adjustment processing of adjusting the polarization plane of the primary radiator 2 (step S202).

Further, when a second start trigger that provides a start event for the processing of adjusting a polarization plane based on the reception level is input from the trigger input means 102 (step S203), the polarization plane adjustment means 103 initializes the adjustment parameters, and determines whether the state of at the time of start of the level adjustment processing is execution or pause according to the input trigger (steps S204 and S205). Here, the polarization plane adjustment means 103 starts the Pause timer and then starts the level adjustment processing (step S207) when the state of at the time of start of the level adjustment processing is "execution state" (Yes in step S205).

In step S207, the polarization plane adjustment means 103 continuously performs the level adjustment processing until the Pause timer expires or another trigger is input. For example, the polarization plane adjustment means 103 may repeatedly perform processing of rotating the primary radiator 2 within a predetermined rotation angle range in such a manner that the level (reception level) measured by the level measurement unit 204 becomes highest.

Meanwhile, the polarization plane adjustment means 103 starts the Resume timer and waits until the Resume timer expires or another trigger is input (step S208) when the state of at the time of start of the level adjustment processing is "pause state", that is, start of pause (No in step S205).

Further, when the Pause timer expires during the execution state (step S209), the polarization plane adjustment means 103 proceeds to step S208, and waits until the Resume timer expires or another trigger is input.

Further, when the Resume timer expires during the pause state (step S210), the polarization plane adjustment means 103 proceeds to step S206, and resumes the level adjustment processing after starting the Pause timer again. The polarization plane adjustment means 103 may or may not take over the parameters (the rotating direction, the number of rotation, and the like) before pause in resuming the level adjustment processing.

Note that the operation illustrated in FIG. 10 is applicable to the antenna device 10 of the first exemplary embodiment. The polarization plane adjustment means 103 of the antenna device 10 of the first exemplary embodiment may perform the operation illustrated in FIG. 10.

Figure 11:
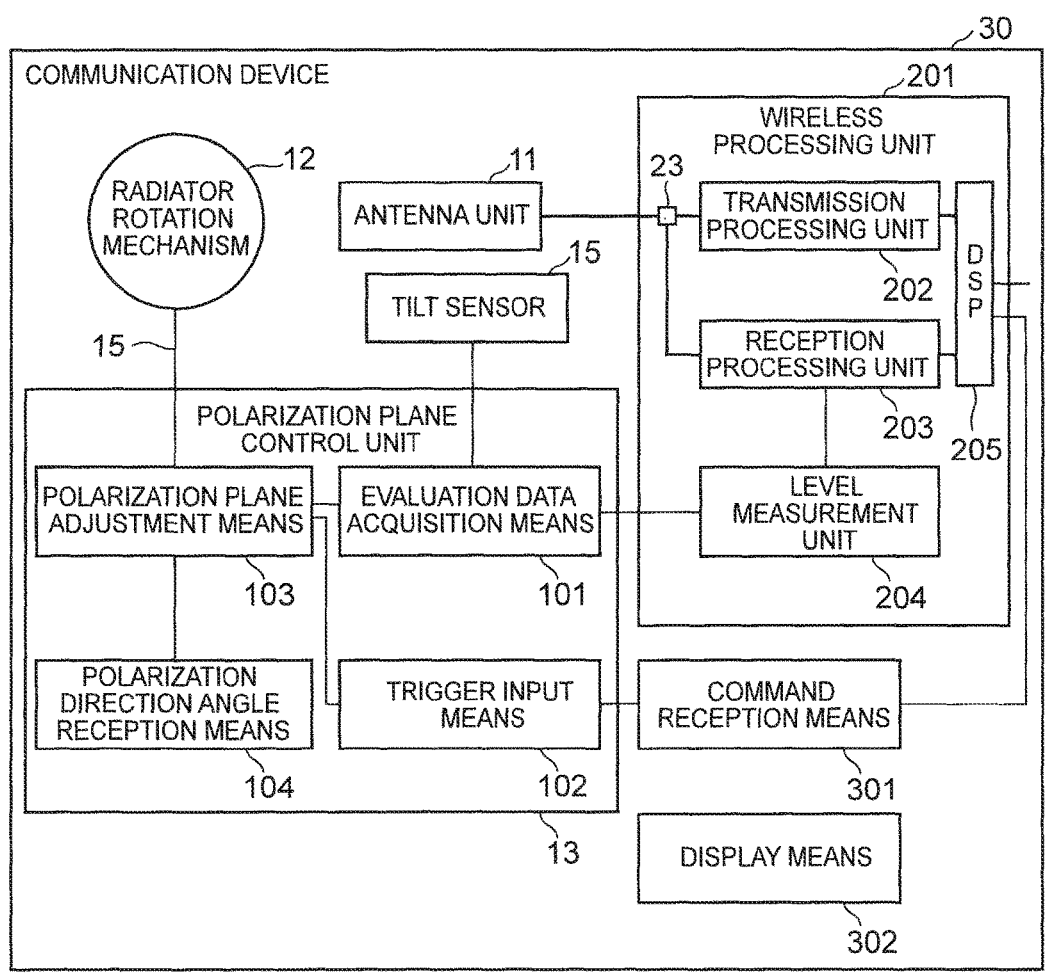
FIG. 11 It depicts a block diagram illustrating another configuration example focusing on a functional aspect of the communication device 30 of the second exemplary embodiment.

Further, FIG. 11 is a block diagram illustrating another configuration example focusing on a functional aspect of the communication device 30 of the present exemplary embodiment. As illustrated in FIG. 11, the communication device 30 may further include command reception means 301 that receives a command from the user and display means 302 that displays information. Note that the command reception means 301 and the display means 302 may be mounted in either the antenna device 31 or the wireless device 32.

The command reception means 301 may receive a command for setting various parameters used in the adjustment processing or a command for causing the wireless processing unit 201 to perform test radio wave transmission processing or reception processing. Further, the command reception means 301 may have a function to input a trigger to the trigger input means 102 and to input a control command or a test signal to the wireless processing unit 201, according to the command received from the user. With such a function, control timing can be matched between the rotation operation of the primary radiator 2, and a transmission operation of the test signal, a reception operation of the test signal, and a level measurement operation associated with the aforementioned operations. The command reception means 301 is realized by, for example, information input means such as a mouse, a keyboard, a touch panel, and a communication interface, and a CPU operated according to a program.

Further, the display means 302 may display content of evaluation data (a value of the reception level and a tilt angle), the current rotation angle θ of the primary radiator 2, and the current polarization direction angle φ of the primary radiator 2. The display means 302 is realized by, for example, a display device.

As described above, according to the present exemplary embodiment, the antenna unit 11 and the wireless processing unit 201 can be further in cooperation with each other, in addition to the effect of the first exemplary embodiment. Therefore, adjustment of polarization planes between communication devices that perform bidirectional communication at arbitrary installation places can be more efficiently performed.

Note that the function to receive the command for setting various parameters used in the adjustment processing, of the display means 302 and the command reception means 301, is applicable to the antenna device 10 of the first exemplary embodiment. That is, the antenna device 10 of the first exemplary embodiment may include the command reception means 301 and the display means 302.

Third Exemplary Embodiment

Figure 12:
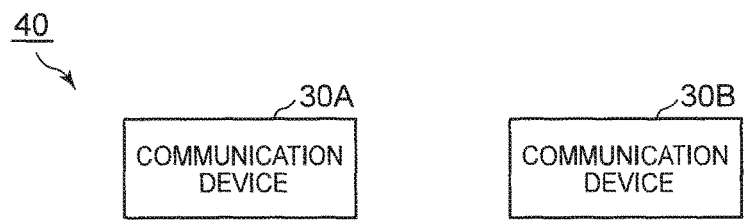
FIG. 12 It depicts a configuration diagram illustrating a configuration example of a communication system 40 according to a third exemplary embodiment.

Next, a third exemplary embodiment of the present invention will be described. FIG. 12 is a configuration diagram illustrating a configuration example of a communication system 40 according to the third exemplary embodiment. As illustrated in FIG. 12, the communication system 40 of the present exemplary embodiment includes two communication devices (a communication device 30A and a communication device 30B) that mutually perform bidirectional communication. The communication devices 30A and 30B may be similar to the communication device 30 of the second exemplary embodiment.

Note that start timing, pause timing, and resume timing for level adjustment processing provided by a trigger input by the trigger input means 102 are different between the communication devices 30A and 30B.

Note that the start timing, the pause timing, and the resume timing may be differentiated between the communication devices 30A and 30B by shifting timing to input the trigger by a user. However, hereinafter, an example to differentiate the timing, using the above-described period specification start trigger, will be described.

Figure 13:
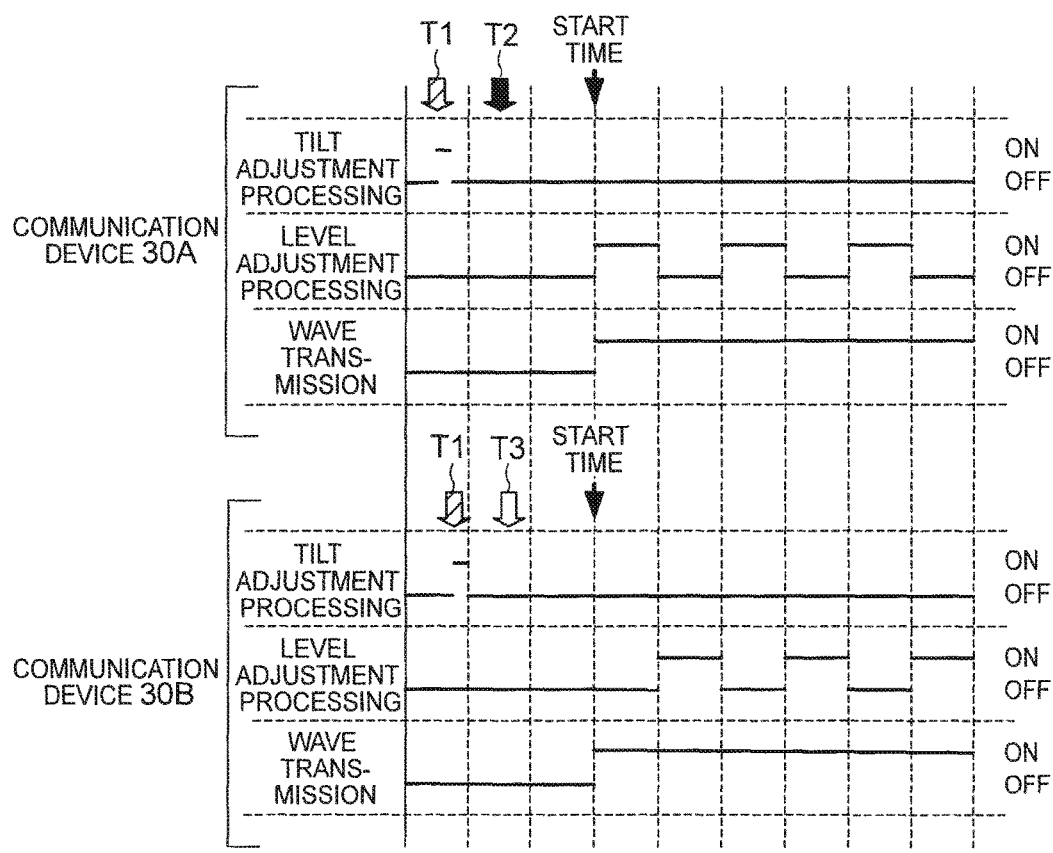
FIG. 13 It depicts a timing chart illustrating an example of control timing of a communication device 30A and a communication device 30B.

FIGS. 13 and 14 are timing charts illustrating an example of control timing of the communication devices 30A and 30B. In the example illustrated in FIG. 13, the same repetitive period (for example, a period in which execution and pause are repeated every five minutes) is set to the communication devices 30A and 30B in advance. In such a case, at the time when development of the communication devices 30A and 30B at installation places are completed, respective users may input triggers that provide start timing of tilt adjustment processing (see the shaded arrows T1 in FIG. 13). Further, the communication devices 30A and 30B may respectively rotate primary radiators 2 based on setting values of polarization direction angles φ received before the start timing, and tilt angles ξ of its own devices. Note that, as the setting values of the polarization direction angles φ provided to the communication devices, angles at which polarization planes are aligned in a mutually facing state are specified.

Further, the users of the communication devices 30A and 30B may respectively input period specification start triggers that include specification of start time and specification as to which of execution and pause is started first, at arbitrary timing before the start time of the level adjustment processing determined in advance, for example. Note that the users may determine which communication device performs execution first, in advance. Therefore, the period specification start trigger (see the filled arrow T2 in FIG. 13) including specification to perform execution first is input to one of the communication devices (for example, the communication device 30A), and the period specification start trigger (see the outlined arrow T3 in FIG. 13) including specification to start pause first is input to the other communication device (for example, the communication device 30B).

In doing so, while the communication device 30A executes the level adjustment processing (ON in FIG. 13), the level adjustment processing of the communication device 30B can be paused. On the other hand, while the communication device 30A pauses the level adjustment processing, the level adjustment processing of the communication device 30B can be executed. Note that, in the example illustrated in FIG. 13, pause timing of the level adjustment processing of one communication device and resume timing of the level adjustment processing of the other communication device overlap with each other. However, for example, as illustrated in FIG. 14, if the start times are shifted between the communication devices 30A and 30B, an arbitrary interval can be provided between the mutual level adjustment processing. Note that FIG. 14 illustrates an example in which transmission of a test signal is started at timing when the period specification start trigger (see the filled arrow T2 in FIG. 14) including specification to perform execution first is input. However, the transmission of the test signal may be performed at arbitrary timing specified by the user.

Note that the communication devices may just repeat execution and pause of the level adjustment processing until a trigger indicating termination is input, when the level does not meet a predetermined criteria or when the level cannot be complemented in the level adjustment processing.

Further, the specification of the start time and the specification as to which of execution and pause is started first may be separately performed using a command. The command reception means 301 may store specified information to a predetermined storage area when receiving such a specification command. The communication devices may read such information stored in the predetermined storage area and perform the level adjustment processing when the start trigger that indicates start timing is input.

As described above, according to the present exemplary embodiment, mutual polarization planes can be efficiently adjusted even between the communication devices that perform the bidirectional communication at a long distance with poor mutual visibility.

Note that the above-described exemplary embodiments have been described using communication devices that perform over-the-horizon communication as an example. However, the method of adjusting polarization planes according to the present invention is not limited to the over-the-horizon communication and is favorably applicable to wireless devices as long as the wireless devices perform bidirectional communication at arbitrary places.

Further, a part or all of the above-described exemplary embodiments can be written but are not limited to as follows.

(Supplementary note 1) An antenna device according to the present invention including a reflecting mirror configured to focus a received radio wave into a predetermined focusing position, a primary radiator (for example, the primary radiator 2) configured to be connected with a wireless device including a transmitter and a receiver, a radiator support mechanism (for example, the radiator support mechanism 4) configured to rotatably support the primary radiator at the focusing position of the reflecting mirror with respect to a central axis of the primary radiator, evaluation data acquisition means (for example, the evaluation data acquisition means 101) configured to acquire evaluation data that is data regarding a polarization direction angle that is a tilt angle of a polarization plane of the primary radiator with respect to a horizontal direction, a tilt angle of its own device correlated with the polarization direction angle, or a reception level that is a level of a radio wave received by the receiver using the primary radiator, polarization plane adjustment means (for example, the polarization plane adjustment means 103) configured to adjust the polarization plane of the primary radiator based on the evaluation data, and trigger input means (for example, the trigger input means 102) configured to input a trigger to the polarization plane adjustment means, wherein the polarization plane adjustment means rotates the primary radiator to adjust the polarization plane according to timing provided by the trigger.

(Supplementary note 2) The antenna device according to the supplementary note 1, wherein the trigger input means inputs the trigger according to a user operation.

(Supplementary note 3) The antenna device according to the supplementary note 1 or 2, wherein the polarization plane adjustment means rotates the primary radiator by controlling drive means (for example, the drive means 5) that provides a rotating drive force to the radiator support mechanism around a central axis of the primary radiator to adjust the polarization plane of the primary radiator.

(Supplementary note 4) The antenna device according to any one of supplementary notes 1 to 3, further including a tilt sensor (for example, the tilt sensor 15) configured to detect the polarization direction angle of the primary radiator or the tilt angle of its own device correlated with the polarization direction angle, wherein the evaluation data acquisition means acquires tilt evaluation data that is the evaluation data regarding the polarization direction angle of the primary radiator or the tilt angle of its own device correlated with the polarization direction angle detected by the tilt sensor, and the polarization plane adjustment means rotates the primary radiator based on the tilt evaluation data.

(Supplementary note 5) The antenna device according to any one of the supplementary notes 1 to 3, further including a tilt sensor configured to detect the polarization direction angle of the primary radiator or the tilt angle of its own device correlated with the polarization direction angle, wherein the evaluation data acquisition means acquires tilt evaluation data that is the evaluation data regarding the polarization direction angle of the primary radiator or the tilt angle of its own device correlated with the polarization direction angle detected by the tilt sensor, and level evaluation data that is the evaluation data regarding the reception level that is a level in the receiver of the radio wave received by the primary radiator, and the adjustment of the polarization plane of the primary radiator performed by the polarization plane adjustment means includes first rotation processing that is rotation processing of the primary radiator based on the tilt evaluation data and second rotation processing (level adjustment processing) that is rotation processing of the primary radiator based on the level evaluation data, and performed after the first rotation processing.

(Supplementary note 6) The antenna device according to the supplementary note 4 or 5, further including polarization direction angle reception means (for example, the polarization direction angle reception means 104) configured to receive a setting value of the polarization direction angle of the primary radiator from a user, wherein the polarization plane adjustment means rotates the primary radiator to cause the polarization direction angle of the primary radiator to be the setting value received by the polarization direction angle reception means in first rotation processing that is rotation processing of the primary radiator based on the tilt evaluation data.

(Supplementary note 7) The antenna device according to the supplementary note 6, wherein the polarization direction angle reception means receives a value other than 0° or 90° as the setting value of the polarization direction angle.

(Supplementary note 8) The antenna device according to any one of the supplementary notes 2 to 7, wherein the trigger input means inputs the trigger when an output value of the tilt sensor becomes a predetermined value or more.

(Supplementary note 9) The antenna device according to any one of the supplementary notes 1 to 8, wherein the evaluation data acquisition means acquires at least level evaluation data that is the evaluation data regarding the reception level, the adjustment of the polarization plane of the primary radiator performed by the polarization plane adjustment means includes second rotation processing that is rotation processing of the primary radiator based on the level evaluation data, the trigger input means inputs a trigger that provides at least executable timing that indicates executable timing of the second rotation processing to the polarization plane adjustment means, and the polarization plane adjustment means does not perform the second rotation processing at timing other than the executable timing provided by the trigger.

(Supplementary note 10) The antenna device according to the supplementary note 9, wherein the executable timing of the second rotation processing provided by the trigger input by the trigger input means is different from timing provided to an antenna device included in another communication device paired with its own device.

(Supplementary note 11) The antenna device according to any one of the supplementary notes 1 to 10, used for one-to-one over-the-horizon communication.

(Supplementary note 12) The antenna device according to any one of the supplementary notes 1 to 11, further including display means configured to display at least one of content of the evaluation data, a current rotation angle of the primary radiator, and a current polarization direction angle of the primary radiator.

(Supplementary note 13) The antenna device according to any one of the supplementary notes 1 to 12, further including a reflecting mirror support mechanism configured to support at least the reflecting mirror, wherein the reflecting mirror support mechanism includes a base on which a body to be supported is mounted, and a plurality of leg portions attached to the base and having an expansion mechanism expandable in a height direction, and the body to be supported is mounted on a moving body using the expansion mechanisms of the leg portions.

(Supplementary note 14) A polarization plane control method including, in an antenna device or a communication device including the antenna device, the antenna device including a primary radiator connected to a transmitter and a receiver, a reflecting mirror, and a radiator support mechanism that rotatably supports the primary radiator at a focusing position of the reflecting mirror with respect to a central axis of the primary radiator, executing, by a control device, processing of acquiring evaluation data that is data regarding a polarization direction angle that is a tilt angle of a polarization plane of the primary radiator with respect to a horizontal direction, a tilt angle of its own device correlated with the polarization direction angle, or a reception level that is a level of a radio wave received by the receiver using the primary radiator, according to timing provided by a predetermined trigger, and rotating the primary radiator based on the acquired evaluation data.

(Supplementary note 15) The polarization plane adjustment method according to the supplementary note 14, wherein the control device acquires tilt evaluation data that is the evaluation data regarding the polarization direction angle of the primary radiator or the tilt angle of its own device correlated with the polarization direction angle, detected by the tilt sensor included in the antenna device, and the control device rotates the primary radiator based on the tilt evaluation data.

(Supplementary note 16) The polarization plane adjustment method according to the supplemental note 14, wherein the control device acquires tilt evaluation data that is the evaluation data regarding the polarization direction angle of the primary radiator or the tilt angle of its own device correlated with the polarization direction angle, detected by the tilt sensor included in the antenna device, and level evaluation data that is the evaluation data regarding the reception level, and the control device performs first rotation processing that is rotation processing of the primary radiator based on the tilt evaluation data and second rotation processing that is rotation processing of the primary radiator based on the level evaluation data and performed after the first rotation processing.

(Supplementary note 17) The polarization plane adjustment method according to the supplementary note 15 or 16, wherein the control device rotates the primary radiator to cause the polarization direction angle of the primary radiator to be a setting value received from a user in the first rotation processing that is rotation processing of the primary radiator based on the tilt evaluation data.

(Supplementary note 18) The polarization plane adjustment method according to the supplementary note 17, wherein the control device receives the setting value other than 0° or 90°.

(Supplementary note 19) The polarization plane adjustment method according to any one of the supplementary notes 14 to 18, wherein the control device does not perform second rotation processing at timing other than executable timing that indicates executable timing of the second rotation processing provided by a trigger input according to a user operation, when performing second rotation processing that is rotation processing of the primary radiator based on the level evaluation data that is the evaluation data regarding the reception level.

(Supplementary note 20) The polarization plane adjustment method according to the supplementary note 19, wherein the executable timing of the second rotation processing provided by the trigger input according to a user operation is different from timing provided to a control device of another communication device paired with the communication device.

The invention of the present application has been described with reference to the exemplary embodiments and examples. However, the invention of the present application is not limited by the exemplary embodiments and examples above. Various changes understandable by a person skilled in the art can be made to the configurations and details of the invention of the present application within the scope of the invention of the present application.

The present invention is based on and claims the benefits of priority from the Japanese Patent Application No. 2015-053138, filed on Mar. 17, 2015, the entire contents of which are incorporated herein by reference.

INDUSTRIAL APPLICABILITY

The present invention is favorably applicable to use to adjust polarization planes of radio waves transmitted/received between communication devices that perform bidirectional communication at arbitrary installation places.

REFERENCE SIGNS LIST

10 Antenna device
2 Primary radiator
3 Reflecting mirror
4 Radiator support mechanism
5 Drive means
6 Polarization plane control device 7 Support mechanism
7-1, 7-2 Support mechanism
7a Pole
7b Base
7c Leg portion
7d Expansion mechanism
11 Antenna unit
12 Radiator rotation mechanism
13 Polarization plane control unit
14 Cable
15 Tilt sensor
16 Control line
101 Evaluation data acquisition means
102 Trigger input means
103 Polarization plane adjustment means
104 Polarization direction angle reception means
20 Wireless device
21 Transmitter
22 Receiver
23 Transmission/reception switch
30, 30A, 30B Communication device
31 Antenna device
32 Wireless device
201 Wireless processing unit
202 Transmission processing unit
203 Reception processing unit
204 Level measurement unit
205 Digital signal processor
301 Command reception means
302 Display means
40 Communication system

The invention claimed is:

1. An antenna device comprising:
a reflecting mirror configured to focus a received radio wave into a predetermined focusing position;
a primary radiator configured to be connected with a wireless device including a transmitter and a receiver;
a radiator support mechanism configured to rotatably support the primary radiator at the focusing position of the reflecting mirror with respect to a central axis of the primary radiator;
an evaluation data acquisition unit implemented at least by a hardware including a processor and configured to acquire evaluation data that is data regarding a polarization direction angle that is a tilt angle of a polarization plane of the primary radiator with respect to a horizontal direction, a tilt angle of its own device correlated with the polarization direction angle, or a reception level that is a level of a radio wave received by the receiver using the primary radiator;
a polarization plane adjustment unit implemented at least by the hardware and configured to adjust the polarization plane of the primary radiator based on the evaluation data; and
a trigger input unit implemented at least by the hardware and configured to input a trigger to the polarization plane adjustment unit, wherein
the polarization plane adjustment unit rotates the primary radiator to adjust the polarization plane according to timing provided by the trigger.

2. The antenna device according to claim 1, wherein the trigger input unit inputs the trigger according to a user operation.

3. The antenna device according to claim 2, wherein the trigger input unit inputs the trigger when an output value of the tilt sensor becomes a predetermined value or more.

4. The antenna device according to claim 1, wherein the polarization plane adjustment unit rotates the primary radiator by a controlling drive unit that provides a rotating drive force to the radiator support mechanism around a central axis of the primary radiator to adjust the polarization plane of the primary radiator.

5. The antenna device according to claim 1, further comprising:
a tilt sensor configured to detect the polarization direction angle of the primary radiator or the tilt angle of its own device correlated with the polarization direction angle, wherein
the evaluation data acquisition unit acquires tilt evaluation data that is the evaluation data regarding the polarization direction angle of the primary radiator or the tilt angle of its own device correlated with the polarization direction angle, detected by the tilt sensor, and
the polarization plane adjustment unit rotates the primary radiator based on the tilt evaluation data.

6. The antenna device according to claim 5, further comprising:
a polarization direction angle reception unit implemented at least by the hardware and configured to receive a setting value of the polarization direction angle of the primary radiator from a user, wherein
the polarization plane adjustment unit rotates the primary radiator to cause the polarization direction angle of the primary radiator to be the setting value received by the polarization direction angle reception unit in first rotation processing that is rotation processing of the primary radiator based on the tilt evaluation data.

7. The antenna device according to claim 6, wherein the polarization direction angle reception unit receives a value other than 0° or 90° as the setting value of the polarization direction angle.

8. The antenna device according to claim 1, further comprising:
a tilt sensor configured to detect the polarization direction angle of the primary radiator or the tilt angle of its own device correlated with the polarization direction angle, wherein
the evaluation data acquisition unit acquires tilt evaluation data that is the evaluation data regarding the polarization direction angle of the primary radiator or the tilt angle of its own device correlated with the polarization direction angle, detected by the tilt sensor, and level evaluation data that is the evaluation data regarding the reception level, and
the adjustment of the polarization plane of the primary radiator performed by the polarization plane adjustment unit includes first rotation processing that is rotation processing of the primary radiator based on the tilt evaluation data and second rotation processing that is rotation processing of the primary radiator based on the level evaluation data and performed after the first rotation processing.

9. The antenna device according to claim 1, wherein
the evaluation data acquisition unit acquires at least level evaluation data that is the evaluation data regarding the reception level,
the adjustment of the polarization plane of the primary radiator performed by the polarization plane adjustment unit includes second rotation processing that is rotation processing of the primary radiator based on the level evaluation data, the trigger input unit inputs a trigger that provides at least executable timing that indicates executable timing of the second rotation processing to the polarization plane adjustment unit, and the polarization plane adjustment unit does not perform the second rotation processing at timing other than the executable timing provided by the trigger.

10. The antenna device according to claim 9, wherein the executable timing of the second rotation processing provided by the trigger input by the trigger input unit is different from timing provided to an antenna device included in another communication device paired with its own device.

11. The antenna device according to claim 1, used for one-to-one over-the-horizon communication.

12. A communication system comprising:
a first communication device and a second communication device;
each of the first communication device and the second communication device including a transmitter;
a receiver;
a primary radiator;
a reflecting mirror;
a radiator support mechanism configured to rotatably support the primary radiator at a focusing position of the reflecting mirror with respect to a central axis of the primary radiator;
an evaluation data acquisition unit implemented at least by a hardware including a processor and configured to acquire evaluation data that is data regarding a polarization direction angle that is a tilt angle of a polarization plane of the primary radiator of the first communication device or the second communication device with respect to a horizontal direction, a tilt angle of its own device correlated with the polarization direction angle, or a reception level that is a level of a radio wave received by the receiver using the primary radiator of the first communication device or the second communication device;
a polarization plane adjustment unit implemented at least by the hardware and configured to adjust the polarization plane of the primary radiator of the first communication device or the second communication device based on the evaluation data; and
a trigger input unit implemented at least by the hardware and configured to input a trigger to the polarization plane adjustment unit, wherein
the polarization plane adjustment unit rotates the primary radiator to adjust the polarization plane according to timing provided by the trigger.

13. A polarization plane control method comprising:
in an antenna device or a communication device including the antenna device, the antenna device including a primary radiator connected to a transmitter and a receiver, a reflecting mirror, and a radiator support mechanism that rotatably supports the primary radiator at a focusing position of the reflecting mirror with respect to a central axis of the primary radiator,
by a control device, executing processing of acquiring evaluation data that is data regarding a polarization direction angle that is a tilt angle of a polarization plane of the primary radiator with respect to a horizontal direction, a tilt angle of its own device correlated with the polarization direction angle, or a reception level that is a level of a radio wave received by the receiver using the primary radiator, according to timing provided by a predetermined trigger, and rotating the primary radiator based on the acquired evaluation data.

* * * * *

UNITED STATES PATENT AND TRADEMARK OFFICE
CERTIFICATE OF CORRECTION

PATENT NO. : 10,020,874 B2
APPLICATION NO. : 15/558651
DATED : July 10, 2018
INVENTOR(S) : Shinichiro Kitano Page 1 of 1

It is certified that error appears in the above-identified patent and that said Letters Patent is hereby corrected as shown below:

In the Specification

Column 9, Description of Embodiments, Line 25; After "tilt angle", insert --$\xi$--

Column 9, Description of Embodiments, Line 56; Delete "$\varphi=\xi+74=0°$." and insert --$\varphi = \xi + \theta = 0°$.-- therefor Column 10, Description of Embodiments, Line 54; Delete "+ direction)(0=15°." and insert --+ direction ($\theta$=15°).-- therefor Column 11, Description of Embodiments, Line 8; Delete "inclined)(-5°" and insert --inclined (-5°)-- therefor Column 13, Description of Embodiments, Line 62; After "angle", insert --$\xi$--

Signed and Sealed this
Nineteenth Day of February, 2019

Andrei Iancu
*Director of the United States Patent and Trademark Office*